United States Patent
Gonçalves Pereira et al.

(10) Patent No.: US 11,879,400 B2
(45) Date of Patent: Jan. 23, 2024

(54) VARIABLE COMPRESSION RATIO DEVICE

(71) Applicants: Almir Gonçalves Pereira, Juiz de Fora (BR); Paulo Roberto De Oliveira, Juiz de Fora (BR); Reinaldo de Souza Barreto, São Paulo (BR)

(72) Inventors: Almir Gonçalves Pereira, Juiz de Fora (BR); Paulo Roberto De Oliveira, Juiz de Fora (BR)

(73) Assignees: Almir Gonçalves Pereira, Juiz de Fora (BR); Paulo Roberto De Oliveira, Juiz de Fora (BR); Reinaldo de Souza Barreto, São Paulo (BR)

( * ) Notice: Subject to any disclaimer, the term of this patent is extended or adjusted under 35 U.S.C. 154(b) by 0 days.

(21) Appl. No.: 17/577,572

(22) Filed: Jan. 18, 2022

(65) Prior Publication Data

US 2022/0136431 A1     May 5, 2022

Related U.S. Application Data

(63) Continuation-in-part of application No. PCT/BR2020/050281, filed on Jul. 22, 2020.

(30) Foreign Application Priority Data

Jul. 28, 2019    (BR) .......................... 102019015490-0
Apr. 7, 2020    (BR) .......................... 102020006998.5

(51) Int. Cl.
*F02D 15/02*     (2006.01)
*F02D 15/04*     (2006.01)
(Continued)

(52) U.S. Cl.
CPC ............ *F02D 15/02* (2013.01); *F02B 75/047* (2013.01); *F02B 75/048* (2013.01); *F02D 15/04* (2013.01); *F16C 3/28* (2013.01)

(58) Field of Classification Search
None
See application file for complete search history.

(56) References Cited

U.S. PATENT DOCUMENTS 3,686,972 A * 8/1972 McWhorter ............. F16C 3/28
                                                       123/48 B
4,301,695 A * 11/1981 Reiher ..................... F16C 7/06
                                                       123/78 F (Continued)

FOREIGN PATENT DOCUMENTS

AU      2010284870 B2 * 4/2015 ............ F02B 75/045
BR      102018002008 A2    8/2019
(Continued)

*Primary Examiner* — Kevin R Steckbauer
(74) *Attorney, Agent, or Firm* — Lowenstein Sandler LLP

(57) ABSTRACT

A variable compression ratio device configured to be incorporated into an internal combustion engine. The internal combustion engine including one or more cylinders housing pistons that are coupled to a crankshaft. The variable compression ratio device including rotation coupler assemblies formed by gears that have internal and external teeth that are disposed at distal ends of the crankshaft to cause the crankshaft to rotate, and two or more eccentrics configured to cause translation variations of the crankshaft. Where the two or more eccentrics are positioned on trunnions of the crankshaft before and after each connecting rod and respective balances, the translation variations are to be converted into rotation and transmitted to a toothed gear and to a flange of a flywheel, and the two or more eccentrics are aligned with corresponding gears to cause changes in translation of a position of the crankshaft.

20 Claims, 15 Drawing Sheets

(51) Int. Cl.
*F02B 75/04* (2006.01)
*F16C 3/28* (2006.01)

(56) References Cited

U.S. PATENT DOCUMENTS

| | | | | |
|---|---|---|---|---|
| 4,860,702 | A * | 8/1989 | Doundoulakis | F02B 75/047 123/78 F |
| 8,662,032 | B2 * | 3/2014 | Pohjalainen | F02D 15/02 123/78 B |
| 10,677,157 | B2 * | 6/2020 | Chottiner | F02D 15/02 |
| 10,787,973 | B2 * | 9/2020 | Heinbuch | F02B 75/048 |
| 2012/0144997 | A1 * | 6/2012 | Pohjalainen | F02D 15/02 91/508 |
| 2014/0238345 | A1 * | 8/2014 | Kamada | F02D 31/002 123/344 |
| 2017/0167370 | A1 * | 6/2017 | Choi | F02B 75/045 |
| 2019/0376445 | A1 * | 12/2019 | Pogam | F02B 75/048 |
| 2020/0080473 | A1 * | 3/2020 | Chottiner | F02B 75/045 |
| 2020/0248637 | A1 * | 8/2020 | Heinbuch | F02B 75/048 |
| 2022/0049759 | A1 * | 2/2022 | Van Weelden | F16D 43/26 |
| 2022/0136431 | A1 * | 5/2022 | Gonçalves Pereira | F02D 15/02 123/48 B |

FOREIGN PATENT DOCUMENTS

| | | | | |
|---|---|---|---|---|
| BR | 102018002008 | A2 * | 8/2019 | |
| BR | 112012003406 | B1 * | 9/2020 | F02B 75/045 |
| CN | 103850809 | A | 6/2014 | |
| CN | 103850809 | A * | 6/2014 | |
| CN | 112502828 | A * | 3/2021 | F02B 75/04 |
| CN | 112502828 | B * | 1/2022 | F02B 75/04 |
| CN | 114076028 | A * | 2/2022 | F16H 35/008 |
| DE | 102011120162 | A1 * | 6/2013 | F02B 75/047 |
| DE | 102013003813 | A1 * | 9/2014 | F02B 75/047 |
| DE | 102017126286 | A1 * | 2/2019 | |
| DE | 102018131215 | A1 * | 6/2019 | F02D 15/02 |
| DE | 102019124023 | A1 * | 3/2020 | F02B 75/045 |
| DE | 102020100311 | B4 * | 2/2023 | F02B 75/04 |
| EP | 1959112 | | 8/2008 | |
| EP | 2464847 | B1 * | 3/2019 | F02B 75/045 |
| EP | 3957835 | A1 * | 2/2022 | F16H 35/008 |
| FI | 121283 | B1 * | 9/2010 | F02B 75/045 |
| FR | 3035680 | A1 * | 11/2016 | F02B 75/048 |
| FR | 3035681 | A1 * | 11/2016 | F16C 17/028 |
| FR | 3036146 | A1 * | 11/2016 | F02B 75/045 |
| FR | 3052495 | A1 * | 12/2017 | F02B 75/048 |
| JP | 2009209759 | A | 9/2009 | |
| JP | 2013068156 | A | 4/2013 | |
| RU | 2570299 | C2 * | 12/2015 | F02B 75/045 |
| WO | WO-2011020943 | A1 * | 2/2011 | F02B 75/045 |
| WO | 2013110470 | | 8/2013 | |
| WO | WO-2013122380 | A1 * | 8/2013 | F02D 15/02 |
| WO | WO-2014056291 | A1 * | 4/2014 | F02B 75/048 |
| WO | WO-2014183460 | A1 * | 11/2014 | F02B 75/048 |
| WO | 2017207903 | | 12/2017 | |
| WO | 2017211727 | | 12/2017 | |
| WO | WO-2018045706 | A1 * | 3/2018 | |
| WO | WO-2021016690 | A1 * | 2/2021 | F02B 75/047 |

* cited by examiner

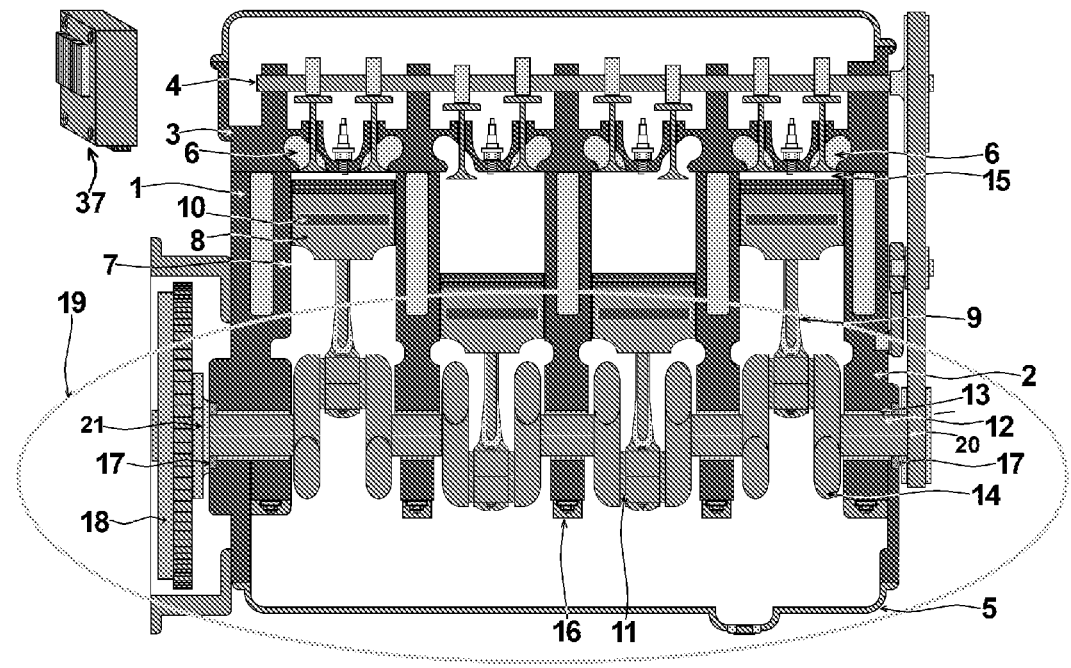
FIG. 1　　　　　　　Prior Art
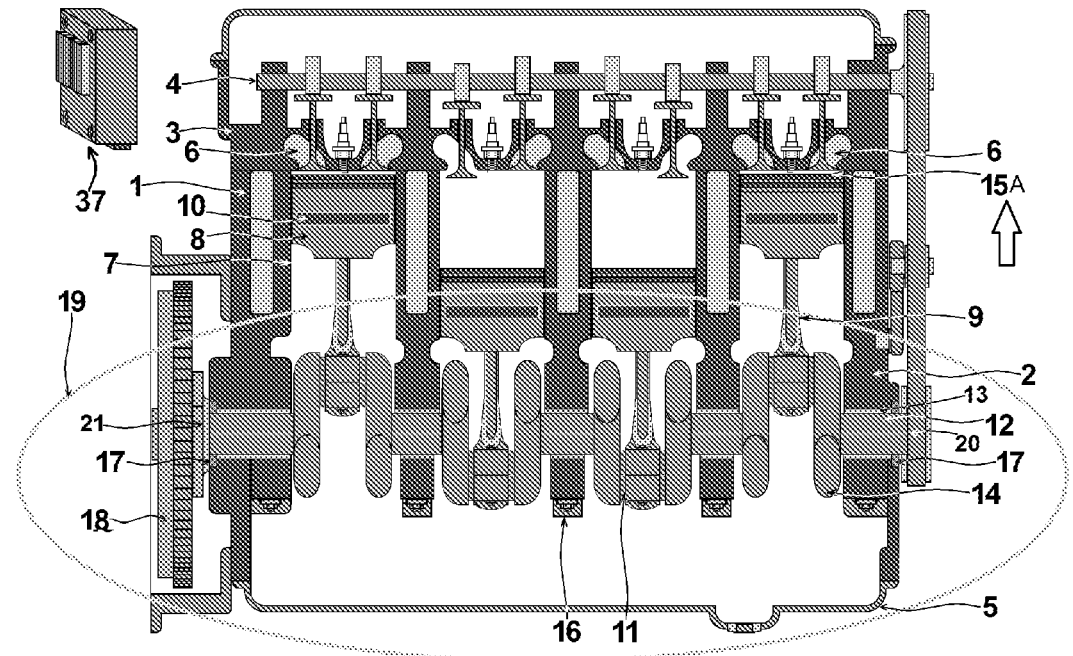
FIG. 2A　　　　　　Prior Art

VARIABLE COMPRESSION RATIO DEVICE

CROSS-REFERENCES TO RELATED APPLICATIONS

This application is a continuation-in-part and claims benefit of PCT Application No. PCT/BR2020/050281 filed Jul. 22, 2020, which claims benefit of Brazilian Patent Application Nos. BR 1 0201 901 5490-0 filed Jul. 28, 2019 and BR 102020006998-5 filed Apr. 7, 2020, the specification(s) of which is/are incorporated herein in their entirety by reference.

BACKGROUND OF THE INVENTION

Field of the Invention

The present invention is applicable to the area of internal combustion engine mechanics in the automotive segment and others, which use internal combustion engines, such as motorcycles, stationary engines, locomotives, ships, military or civilian automotive equipment, and is also applicable to any machines that work with fluid compression that may benefit from the possibility of dynamic variation in the compression ratio.

More precisely, the present invention refers to an electromechanical device, to be incorporated into the design and manufacture of internal combustion engines, the same consisting of the combination of two specific mechanisms, the first being an elaborate mechanism, called eccentric actuator, which allows, by means of the movement of these eccentrics, to change, under the command of an electronic control unit, the relative position of the crankshaft in relation to the top dead of the pistons, inside the cylinder, increasing or decreasing the compression ratio according to the needs of the engine. The second mechanism is the rotation coupler, formed by a gear of internal teeth, the crown and an axis with external teeth gear, the sprocket, to be applied at one or both ends of the crankshaft of the engines.

The association of these two mechanisms, the eccentric actuator and the rotation couplers, form the variable compression ratio device that enables the dynamic variation of the compression ratio in internal combustion engines (and others, as mentioned above), which can be modified to meet the different situations of changes in the dynamic requirements of the engine and in the type of fuels (ethanol, gasoline, natural gas or others, and even combinations thereof), providing higher engine performance, due to the adequacy of the compression ratio of this engine to not only static characteristics but also dynamics, in order to provide substantial improvement in the performance of these engines.

An electronic control center, isolated or integrated to the vehicle center, will be responsible for analyzing the engine parameters (such as the type or types of fuels and their dosage, engine turns, altitude, temperature, power needs, among others) and the application of the controls that will choose and apply the compression ratio to achieve the best result for the engine.

State of the Art

One of the most desirable characteristics and sought, for decades, by the designers of internal combustion engines is exactly the possibility of being able to change the compression ratio of these engines, which led to numerous proposals being designed to meet this objective. However, to date, few manufacturers have implemented a dynamic variable compression ratio solution in their internal combustion engines, mainly due to the difficulties and technical complexity to adequately meet this solution, in addition to the cost of these engines. Another limiting factor refers to the complexity imposed on the maintenance of such engines, which brings severe restriction to its popularization and widespread application. Due to these factors, no manufacturer has yet to effectively provide a technology for dynamic variation of the compression ratio that is simple, accessible to the general public, and universally applied.

Currently, what is observed is that almost all internal combustion engines, even those of the multifuel type, called flexible engines, have the fixed compression ratio, that is, the relationship between the maximum internal volume of the cylinder and the minimum or compressed volume, is not altered, remaining constant by means of the operation of the engine, regardless of work situations or characteristics. Thus, the performance of the engines is visibly compromised and limited by this invariability of the compression ratio. It is known that the yield obtained with multifuel vehicles is far from ideal, falling below the performance of single-fuel vehicles. Even so, the flexible engines adequately meet what the market asks, attest to their large production for decades. However, if the internal combustion engine has the option of varying its compression ratio, there will be substantial improvement in the volumetric yield of these engines (higher power with the same volume of cylinders and lower weight of these engines), fuel savings with lower generation of pollutants, among many other advantages.

In the search for prior art technologies related to the present invention, patent documents were found proposing to enable the change of compression ratio in internal combustion engines, with solutions that may, at first sight, resemble the present invention:

BR PI 9306645-7 A (Process and device for adjusting the compression ratio of an internal combustion engine) [Jun. 30, 1993];

BR PI 9607054-4 A (Internal combustion engine of the piston type engine alternated with variable compression ratio [Feb. 3, 2005];

BR PI 0904014-5 A2 (Engine with adjustable compression ratio) [Oct. 2, 2009], assigned to the same inventors of the present invention.

191 The above patent documents propose solutions for the variation of the compression ratio by changing the position of the pistons in relation to the top dead of these.

However, none of the above three techniques present an integrated crankshaft mechanism that offers an effective solution for coupling its variations of rotation and translation to the external elements, that is, the shaft that drives the opening and closing commands of the valves of the cylinders, as well as the shaft that is connected to the flange of the flywheel. This absence of an adequate coupling makes it impossible to apply the above-mentioned prior art references, provided that, without an adequate coupling of variations (turning and translation of the crankshaft), all the technologies mentioned are, in practice, incomplete and invalidated for application in real engines, because the simple change in the position of the crankshaft does not solve the issue of implementation of the device to an engine, because the correct external coupling of these variations will be missing.

It is also worth mentioning and analyzing, with emphasis, the patent application of the same inventors of the present invention filed on Jan. 1, 2018, no. BR 102018002008-0. Unlike the other technologies mentioned above, which have no similarity to the present invention, this document has some similarities, and, unlike the present invention, it makes use of an intermediate gear with internal teeth, which is the basic element of this document.

There are also documents from other countries that, like the others mentioned above, may also lead to the understanding that these are solutions equivalent to that of the present invention:

EP 1380739A1 (Jul. 9, 2003—Compression ratio control apparatus and method for spark ignition internal combustion engine);

U.S. Pat. No. 7,185,615 (Apr. 11, 2003—Variable stroke engine).

US 20070034186 (Aug. 9, 2006 Variable engine displacement/compression);

US 20070245992 (May 30, 2007—Variable displacement/compression engine);

The previous techniques listed above were separated from an extensive group, because they are the ones that most closely approximate to the technology proposed by the present invention, and none of these documents offers a complete solution to couple the variations of the position of the crankshaft to external axes, which was fully solved by the device of the present invention.

Indeed, the Japanese manufacturer Nissan Engine Company announced in 2017 that it would launch a vehicle equipped with an engine with a device that would work with variable compression ratio, designed by its subsidiary Infiniti, as published in Quatro Rodas magazine at the address www.quatrorodas.abril.com.br/noticias/novo-motor-com-taxa-decompressao-variavel-pode-salvar-os-motores-flex/#, of Nov. 22, 2017. Such a release, in fact, occurred (www.infinitiusa.com/crossover/gx50/). Nissan's proposal has merits, mainly for being the first to commercialize. However, the high complexity of its engine can greatly increase the costs of its maintenance. This launch, however, proves the commercial applicability of making variable compression ratio of internal combustion engines, being this technical solution something that has been intensely sought, because it represents an important and rewarding advance, even if it brings more complexity and the inevitable increase of the project and vehicles. In Nissan's engine, the compression ratio is varied by changing the piston position by means of a pivot set that acts as a balance, directly in the connecting rod position. The eccentric does not act directly on the crankshaft (as in the present invention), but in the position of a rod that is on the opposite side of the connecting rod. Thus, in Nissan's solution, for each piston, a connecting rod, a balance and a rod attached to the eccentrics will move together, in addition to the crankshaft itself. In this solution, and in most other proposals, there is a significant increase in the number of parts that perform movements associated with pistons and connecting rods, which implies greater dynamic weight in the engine, and a common technical recommendation is the reduction of these weights, so that the balancing of the engine is less critical, more efficient and less subject to eventual defects.

Analyzing the solutions that the state of the art presents to meet specific cases, by means of the current and traditional manufacture of internal combustion engines that use only the fixed compression ratio, it is verified that they aim to meet the following two situations, even if, in them, the compromise of engine performance persists:

1—Single fuel engines, wherein, for each type of fuel, gasoline, diesel, ethanol, gas or any other, a corresponding fixed compression ratio is used that provides the best average performance for that engine. But it is not enough that this fixed compression ratio is well chosen for the yield to be maximum, because there are other parameters where the engine requirements change, for example, whether it is in low or high rotation, in a low or high acceleration regime, among others. In such cases, the fixed compression ratio is no longer the ideal solution, as it does not suit variations in the dynamic needs of the engine.

2—Multifuel or flex engines, currently very common in Brazil, for example, for gasoline and ethanol, where the fixed compression ratio is chosen between values that serve only averagely both the use of gasoline and ethanol, or other fuels, or even the mixture of fuels. Such engines are in a disadvantageous situation, in terms of yield, compared to the single fuel engines mentioned in the previous item, because the effective compression ratio will be far from ideal for each fuel. As an illustration, the compression ratio of gasoline is between 8:1 and 10:1, while ethanol is higher, between 12:1 and 15:1. Flexible engines use an average value, for example, around 11:1. The present invention aims to allow the user to choose various fuels or mixtures thereof, according to the availability of each one. It is the exchange of the best average yield for versatility.

Both proposals of the previous paragraph, therefore, technologically speaking, are far from ideal, which justifies the incessant search for a solution that allows the compression ratio to be varied in order to meet not only the issue of the type of fuel or fuels employed and their mixtures, but also the complex issues of the dynamic requirements of the internal combustion engine operating regime.

Although the technology of internal combustion engines has been well known and explored for more than a century, even with the inevitable arrival of electric vehicles or other technologies, they will still have an expressive market for a few decades, still including the research of new improvements. There are many factors that still justify the search for improvements in internal combustion engines, among which we mention:

It is estimated that the adoption, on a large scale, of all-electric vehicles will only occur between 2035 and 2040, especially in Europe. Other countries have longer forecasts or are still not forecasted.

Large engines, such as trucks, locomotives, ships, stationary and others will take all the time to migrate to the electric type.

Quatro Rodas Magazine reported that Fiat Brazil will invest heavily in a new 100% ethanol engine (https://quatrorodas.abril.com.br/noticias/motor-turbo-a-alcool-da-fiat-deve-use-hydrogen-and-ignicao-por-plasma/, March 2020), indicating that there is a future for these internal combustion engines.

Electrical power generation experts fear that the global electric system will not support such a violent increase in electricity consumption as necessary to meet a plant of millions of electric and hybrid vehicles, each requiring between 20 and 100 kilowatt hours daily to recharge their batteries.

SUMMARY OF THE INVENTION

It is intended, with the present invention, to solve the deficiencies of the state of the art pointed out above, as well as to meet some fundamental requirements, which are:

a) enable the variation of the compression ratio of internal combustion engines;

(b) adopt technically simple solutions; and c) enable its production with relatively low costs, enabling its wide use, including in low-cost engines, significantly favoring not only the automotive market, but any segment that uses internal combustion engines, such as stationary engines, motorcycles, trucks, generators, ships, and related.

It is worth noting that the variable compression ratio device according to the present invention also changes the position of the pistons to vary the distance of the pistons to the head, to change, by means of eccentrics, the compression ratio of internal combustion engines, however, this change acts in the position of the crankshafts, by means of gears associated with these eccentrics that, in turn, they are moved by means of other gears sympathetic to an axis, which is moved to the position chosen by the electronic central, by means of a step motor or servomotor.

Thus, the present invention has as its main aspect the inclusion of a gear of internal teeth at one end or at both ends of the crankshaft itself or, optionally, in the elements associated with the end of the crankshaft, such as the flywheel support flange or the belt associated with the crankshaft spike, by means of which the external elements associated with the engine can be actuated, such as the drive shaft, water pump, air conditioner, alternator or any other elements. Thus, in the present invention, the technical basis and design of the couplers are substantially changed and the number of elements of these elements that will be directly or indirectly associated with the crankshaft is substantially changed, also obtaining greater mechanical durability of the assembly.

As already said, in a differentiated and feasible way, the proposal of this invention may, in specific cases, unlike all other proposals for the variation of the compression ratio already known, be also applied to engines in use or already available in the market, by means of the offer of specific kits, by the auto parts industry, which enhances its usefulness for a market composed of the current and future fleet, of more than 1 billion vehicles with internal combustion engines, a market that will still exist for a long time. This offer of kits will be important for those who cannot purchase new electric vehicles, so that they can modernize their own vehicles.

The use of the invention will open the market for the supply of spare parts for new and adapted vehicles, for several decades.

The adoption of the solution presented in this invention will also result in important indirect gains, such as lower levels of environmental pollution and, due to the higher volumetric yield of these new internal combustion engines, they can be manufactured in smaller sizes, offering power that may be even above those offered by the engines that use the current technology, with less use of materials, thus reducing the cost of its manufacture and commercialization, besides favoring, with this, the environment.

Strictly speaking, there is no coincidence of the solution outlined here with any other mentioned, since the present invention refers to a device that contains a mechanism to promote changes in the position of the crankshaft by means of eccentrics, to vary the distance between the piston and the head, together with another mechanism that provides the correct adaptation of these variations to the external elements to the crankshaft, by means of one or more coupler elements, each formed by two gears, one of internal teeth and the other of external teeth, whose functions will be better detailed ahead.

BRIEF DESCRIPTION OF THE DRAWINGS

FIG. 1 shows, in section, a typical example of a traditional internal combustion engine with average fixed compression ratio.

FIGS. 2A and 2B show, in section, two internal combustion engines, both with fixed compression ratios, where you can view combustion chambers with different volumes.

DETAILED DESCRIPTION OF THE INVENTION

FIG. 1 presents, in section, a typical example of a traditional internal combustion engine with average fixed compression ratio, for example, of a flexible engine, to compare the changes proposed in this invention, being: (1) engine block; (2) bottom of engine block with crankshaft bearings; (3) engine head; (4) valve control shaft; (5) crankcase cover; (6) fuel mixture ins or outflows; (7) bodies of engine cylinders; (8) pistons or plungers; (9) piston connecting rods; (10) piston shafts; (11) connecting rod shafts (pivot), in the crankshaft; (12) crankshaft (trunnion); (13) bearings of the crankshaft; (14) crankshaft counterweights; (15) combustion chambers; (16) crankshaft shims; (17) crankshaft retainers; (18) flywheel. In (19) there is an ellipse that makes a delimitation, in a traditional motor, where the application of the variable compression ratio device will be made according to the present invention.

Figure 2B:
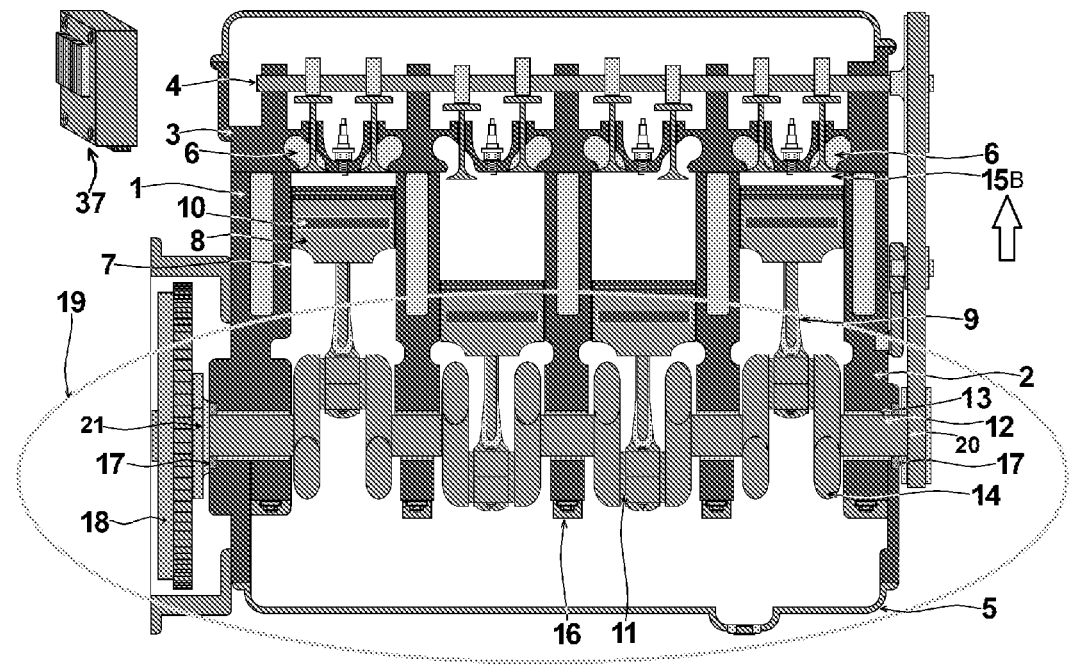

FIGS. 2A and 2B show, in section, two internal combustion engines, both with fixed compression ratios, where the combustion chambers can be visualized, and their size (small) exemplifies, in the first engine (FIG. 2*a*), the high compression ratio and in the second (FIG. 2*b*) (higher), the low compression ratio. The numeric indications are: (15 *a*) combustion chamber with high compression ratio; (15 *b*) combustion chamber with low compression ratio. The remaining numeric indications refer to the same parts of the engine as FIG. 1.

Figure 3:
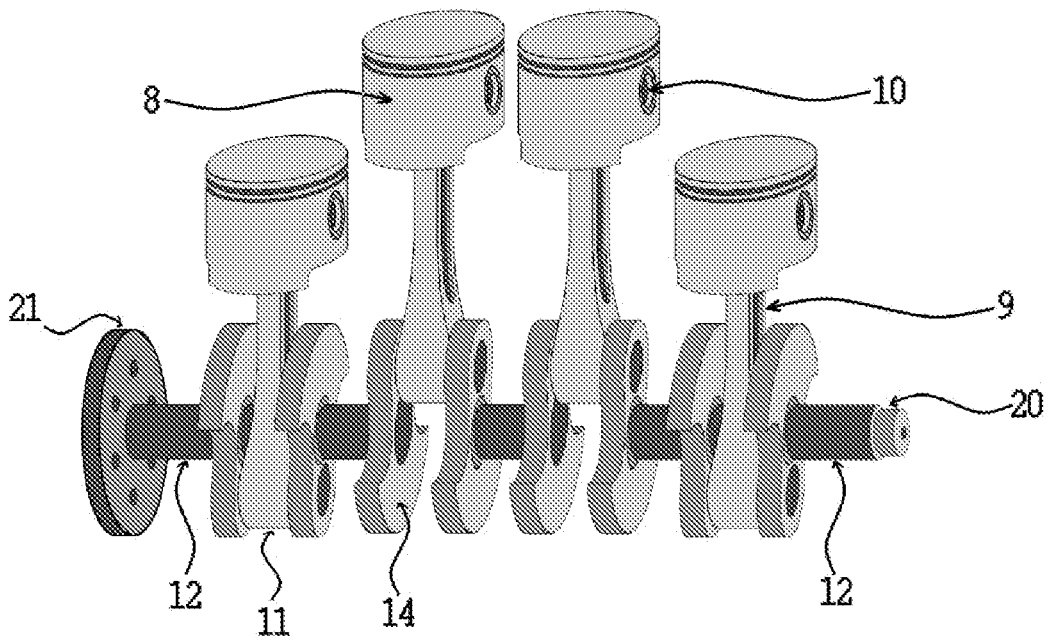
FIG. 3 shows the internal moving parts of a typical internal combustion engine, to better understand the subsequent inclusion of the device of the present invention.

FIG. 3 shows the internal moving parts of a typical internal combustion engine, for a better understanding of the subsequent inclusion of the device according to the present invention. Such parts are the main ones for the definition of the compression ratio, i.e., the pistons (8), next to the cylinders (7) in FIG. 1, here not represented for separate visualization of the pistons (8); the connecting rods (9) and the shaft (trunnion) of the crankshaft (12). The other numerical references have already been mentioned in FIG. 1, (20) the sprocket of the crankshaft (12) and (21) the flange (disc) of connection of the crankshaft (12, which also identifies its "trunnions" or supports) at the flywheel of the engine (18 in FIG. 1) and (11), the rod axis (pivot), responsible for transmitting the movements of the pistons (8) to the crankshaft (12).

Figure 4:
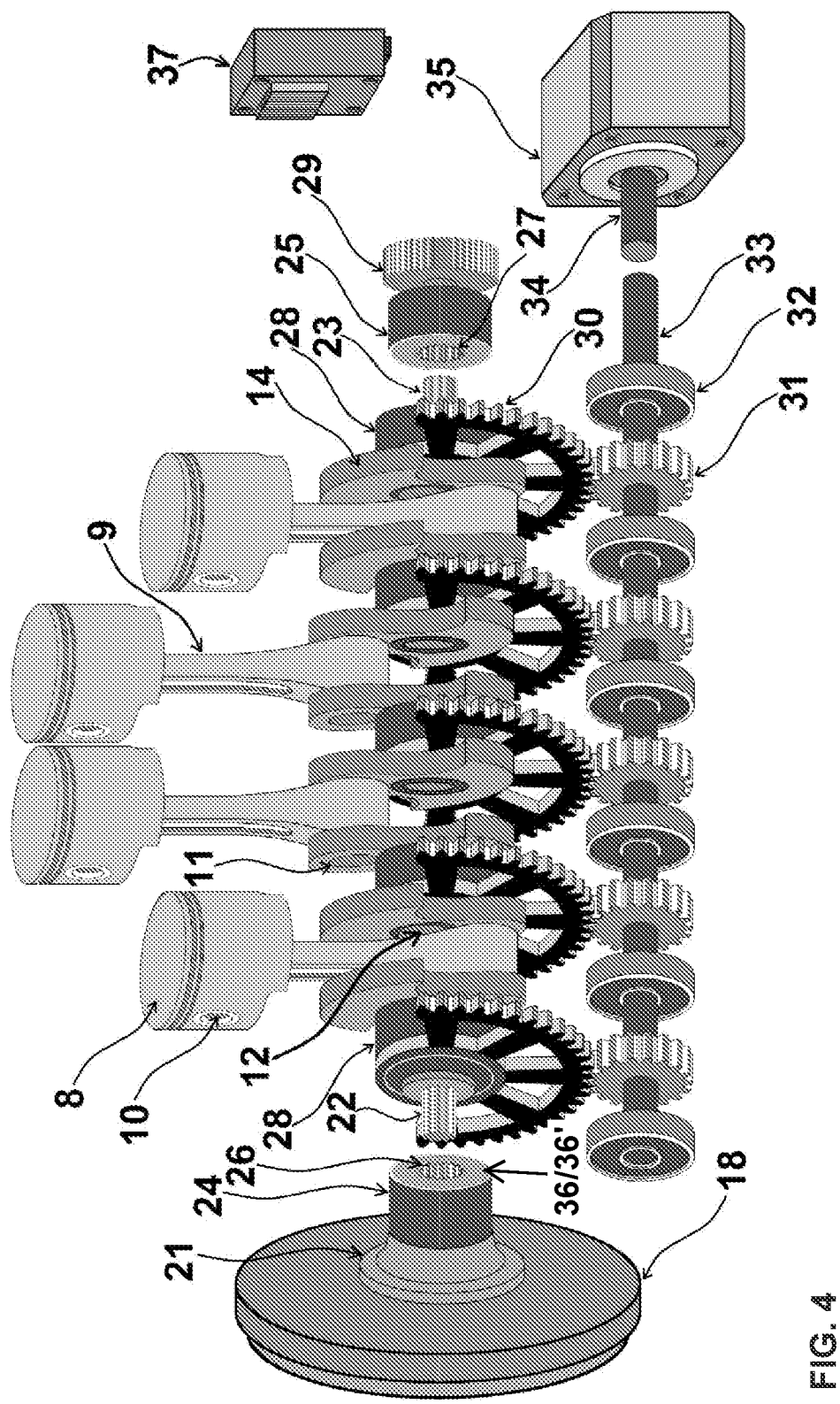
FIG. 4 shows the parts of the internal combustion engine referred to in the previous figures, especially those in FIG. 3, with one of the possible applications of the device of the present invention.

FIG. 4 shows the parts of the internal combustion engine referred to in the preceding figures, especially those in FIG. 3, with one of the possible applications of the variable compression ratio device according to the present invention, already added to said engine. The parts of the engine that will not be altered have not been shown, for better visualization and understanding of the inclusion of the variable compression ratio device according to the present invention. It can be identified, in the eccentric actuator: the master gears (30) sectioned, driven by intermediate gears (31), whose shaft (33) is arranged below the crankshaft (12), however, any other positions are possible. The shaft (33) of the impeller gears (31) will be driven by the axle (34) of the stepper or servomotor (35), which will be controlled by an electronic control unit (37). In (28), there are the eccentrics, within which the crankshaft (12) will move (turning and sometimes translation). These eccentrics (28) will have movement in solidarity with the master gears (30), so that (28) they take the position determined by the electronic control unit, by means of the step motor or servomotor (35). It should be noted that the eccentrics will move supported on bearings, to be presented in later figures, Thus, when moved in translation, the eccentrics (28) will impose on the crankshaft (12) and aggregates, positions that will cause the pistons (8) to determine any compression ratio, from low to high, including intermediate positions. So as the crankshaft turns (12) are properly transferred to external elements, such as the flywheel (18) and the control axis, it is necessary that translation movements of the crankshaft (12) are not transferred but isolated. The element or mechanism responsible for this function, perhaps the most important of the variable compression ratio device according to the present invention, is the rotation coupler (36/36'), to be best detailed in another paragraph), whose function is to transfer rotations of the crankshaft (12) to the external elements of the engine (e.g., flywheel (18) and toothed gear (29), without transferring their translations, imposed by eccentrics (28). If the rotation coupler (36/36') was not used, the invention would be unusable, because the rotations of the crankshaft (12) would not be transferred, for example, to the flywheel (18) and to the gearbox and the drive wheels; likewise, the invention would be useless. FIG. 4 shows that, in this example of application of the variable compression ratio device according to the present invention, there are two rotation couplers (36/36'), one of which is formed by the set of the crown (26) and sprocket (22), connected to the flywheel, and the other, formed by the crown assembly (27) and the sprocket (23), connected to the toothed gear (29). The crowns (26/27) rotate in bearings or bronze bushings (13), supported on bearings (2), to be shown in posterior figures. Shaft bearings (32) (33) can be replaced by bearings, as an option of the designer.

Figure 5:
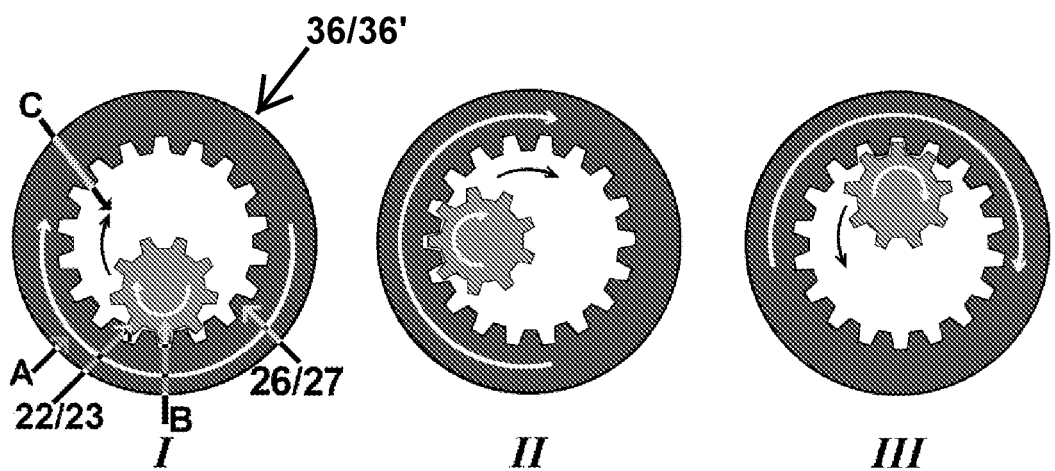
FIG. 5, divided into 3 (three) stages shows the operation of the rotation coupler according to the present invention.

FIG. 5, divided into 3 (three) stages, shows the operation of the rotation coupler (36 or 36'), formed by the crown (26 or 27) and the sprocket (22 or 23). In (I) we can identify the main elements of the rotation coupler (36 or 36'). The numbers (22/23) and (26/27) indicate, respectively, the sprockets and crowns; the letters (a and b) indicate the rotational movements of the gears; the letter (c) indicates the translational movement of the crankshaft (12 in FIG. 4), imposed on sprockets (22/23). As it can be seen, when the sprockets (22/23) rotate, they impose solidarity turning, of the same direction (arrows a and b) to the crowns (26/27). FIG. 5-I shows that the sprockets (22/23) are in their lowest position, indicating that the crankshaft (12 in FIG. 4) is imposing pistons (8 in FIG. 4) to exert a low compression ratio, for example, of 8:1. FIG. 5-II shows that the sprockets (22/23) were moved about 90° upwards, by imposing the mechanism that translates the crankshaft (12) by means of the eccentrics (28). As the crankshaft (12) continues to rotate during engine operation, the sprockets (22/23) will continue, in their ascent to the new position, imposing solidarity turning, of the same direction, to the crowns (26/27), however, as this new position is higher than the previous one, the set will be producing, by means of the pistons (8 in FIG. 4) an intermediate compression ratio, for example, 12:1. Finally, FIG. 5-III shows that the sprockets (22/23) assumed the highest position, also by imposing the crankshaft (12), thus producing, in the engine, due to the position imposed on the pistons (8) a high compression ratio, for example, of 16:1. While the engine is running, regardless of which compression ratio is being applied, the sprockets (22/23) and crowns (26/27) will be turning in solidarity and always in the same direction (arrows a and b). As can be seen in FIG. 5-III, arrow C is in the opposite direction (descending) to the positions in FIGS. 5-I and 5-II. The reason for this is that the travel of sprockets (22/23) takes place only in a limit of 180°, going from low to high compression ratio. When moving from the high to intermediate compression ratio, the sprockets will be moved down, and may assume any intermediate positions or compression ratios, for example, 15:1, 13:1, 11:1, etc. It should be emphasized that, in order for the movement of the crankshaft (12), imposed by the strong explosions on the pistons, to oppose the movement of the eccentrics (28 in FIG. 4), it is convenient that the movement of its translation, towards the high compression ratio, when the internal pressure at the top of the pistons (8) will be maximum, in the same direction as the turn of the crankshaft (12), so that the crankshaft movement itself (8) assists the eccentrics (28) in this movement. On the other hand, when the eccentrics (28) are "descending" from a higher to a lower compression ratio, they will be aided, on this descent, by the weight of the crankshaft itself (12) and by the lower pressure on the pistons (8).

Figure 6:
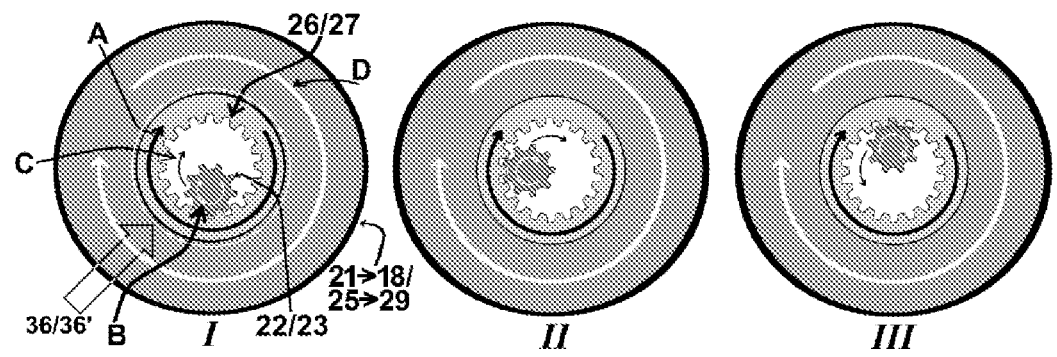
FIG. 6 represents, in 3 (three) stages, an arrangement here called direct rotation coupler according to the present invention.

FIG. 6 represents, in 3 (three) stages, in a provision here called direct (which is the simplest and most feasible), characterized by the crowns (26/27) of the rotation coupler (36/36' within the white circle) being directly mounted on the flywheel (18, flange 21 is implicit) or toothed gear (29), imposing them identically rotating, including the direction. As explained in FIG. 5, the coupler (36/36), composed of crowns (26/27) and sprockets (22/23), is, in FIG. 6-I, in the position of low compression ratio. In FIG. 6-II, the sprockets (22/23) determine an intermediate compression ratio position, since it can be any value between the high and low compression ratio. Finally, in FIG. 6-III, the sprockets (22/23) are at the top of the translation of the crankshaft (12), determining the high compression ratio. As the flywheel will rotate continuously, regardless of the compression ratio chosen by the electronic control unit (37), the driving force produced by the internal combustion engine containing the variable compression ratio device according to the present invention, will function as a conventional engine, but taking advantage of the advantages that said device offers, such as higher yield and less pollution.

Figure 7:
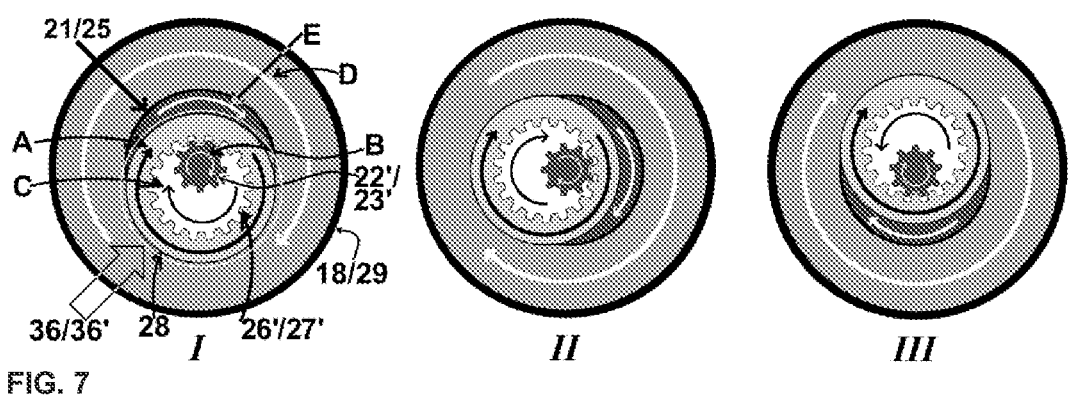
FIG. 7 represents, in 3 (three) stages in a provision here called indirect rotation coupler according to the present invention.

FIG. 7 shows, also in 3 (three) stages, in a provision here called indirect, which is less simple and less recommended than the direct arrangement, presented in FIG. 6, characterized by the crowns (26/27) being mounted on the side of the crankshaft (12). This assembly of the crowns (26/27) on the side of the crankshaft (12), because they have a diameter much larger than the sprockets (22/23), presents difficulties that make the indirect arrangement disadvantageous in relation to the direct arrangement. FIG. 7-I identifies the flange (21) of the flywheel (18) or the toothed gear (29), to which, in this arrangement, the sprockets (22/23) are connected. Thus, the crowns (26/27) will be mounted and solidary to the crankshaft (12) at its ends. Due to the union of the crowns (26/27) with the crankshaft, they will be the ones which, in addition to rotation, will undergo translational movements, exactly like the crankshaft (12). In this case, for the rotation coupler (36/36') to function correctly in the indirect arrangement, the sprockets (22/23) will only have rotational movement and never translation, This can be observed in the stages (I, II and III) shown in this figure, since these sprockets remain positioned in the center of the flywheel (18) or toothed gear (29). However, it can be seen, in FIG. 7-I, that in the rotation coupler (36/36), the crowns (26/27) will undergo rotation and translation, in solidarity with the crankshaft (12), to which they are directly connected. Also, it can be observed, in FIG. 7-I, that the crowns (36/36') are, like the crankshaft (12), in the lower position corresponding to the low compression ratio. In FIG. 7-II, there was translation of the crowns (26/27) to the position of intermediate compression ratios, without prejudice to the proper rotations, which will impose on the sprockets (22/23) rotations that will be transmitted to the flywheel and the toothed gear. The same will occur in FIG. 7-III, where the crowns (26/27) of the rotation coupler (36/36'), as well as the crankshaft (12) will be in the upper position, corresponding to the high compression ratio. It is verified that the translation movements of the rotation coupler (36/36') will not interfere with the rotation of the flywheel (18) and the toothed gear (29). As an important observation, it is worth noting that the indirect arrangement presents other difficulties of implementation, in addition to the assembly of the crowns (26/27) in the crankshaft but, the main one, refers to the fact that, in this provision, the gears of larger diameter (and, consequently, with more teeth), the crowns (26/27), are the ones that will actuate the sprockets, which have smaller diameter (and less teeth), which is not technically recommended. This provision is disclosed herein to provide a wider understanding to the present invention, variable compression ratio device according to the present invention.

Figure 8:
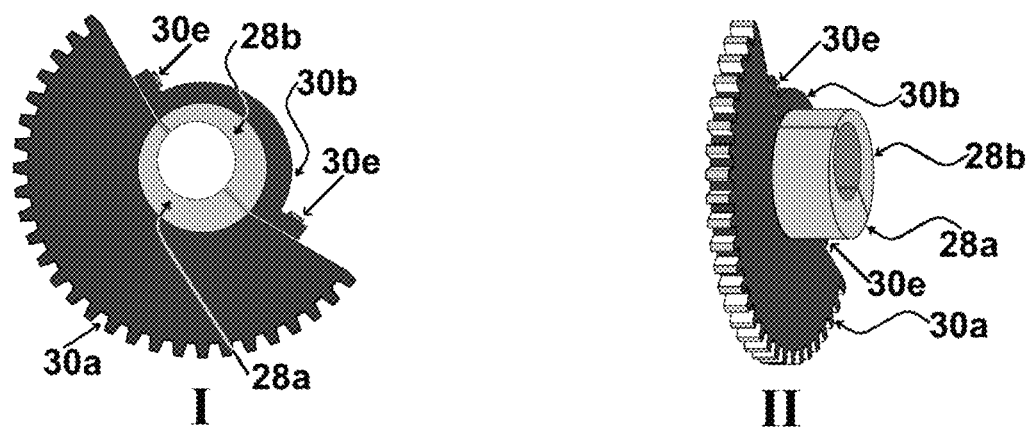
FIG. 8 illustrates the essential parts of the device according to the present invention.

In FIG. 8, essential parts of the variable compression ratio device according to the present invention, as well as coupler assemblies (36/36') the so-called master gears (30), belonging to the eccentric actuating mechanism, can be manufactured in various versions and formats, however, always aiming to meet the function of imposing translational movements to eccentrics (28), to which they will be rigidly united, since they will bear, with them, all the pressures, tensions and movements of the crankshaft (12). Some of the possible versions of the master gears (30) will be shown in FIGS. 8, 9 and 10. In FIG. 8, we see, in (I), the version of a mastergear (30), built in smooth shape, that is, without holes, whose manufacture is simpler than the hollow gears. To allow its assembly in the middle of the crankshaft (12), in internal squares, it is necessary that the master gears (30) be divided into two parts, being as master semi-gears (30 a and 30 b). To ensure perfect coupling between the master semi-gears (30 a) and the intermediate gears (31), it is advisable that the teeth of the master semi-gears (30 a) advance at least one tooth on each side thereof. On the opposite side of the semi-gears (30 a) there is the support part (30 b), which attaches it to the trunnions, by means of the eccentrics (28), here also divided into two parts (28 a and 28 b), and fixing screws (30 e) of the support (30 b) can be observed. In (II), there is a side view, in perspective, where one can better observe the eccentric (28), rigidly fixed to the parts of the master semi-gears (30 a and 30 b). It is noteworthy that the fastening screws (30 e) can be replaced by internal fixing pins between the two parts of the eccentrics (28 a and 28 b), as well as the parts of the semi-gears (30 a and 30 b). It is worth saying that the bronze brushings (13), supported by the bearings (2) and their shims (16), to be shown in later figures, will collaborate to keep the eccentrics and their master semi-gears (30 a and 30 b) in the correct position.

Figure 9:
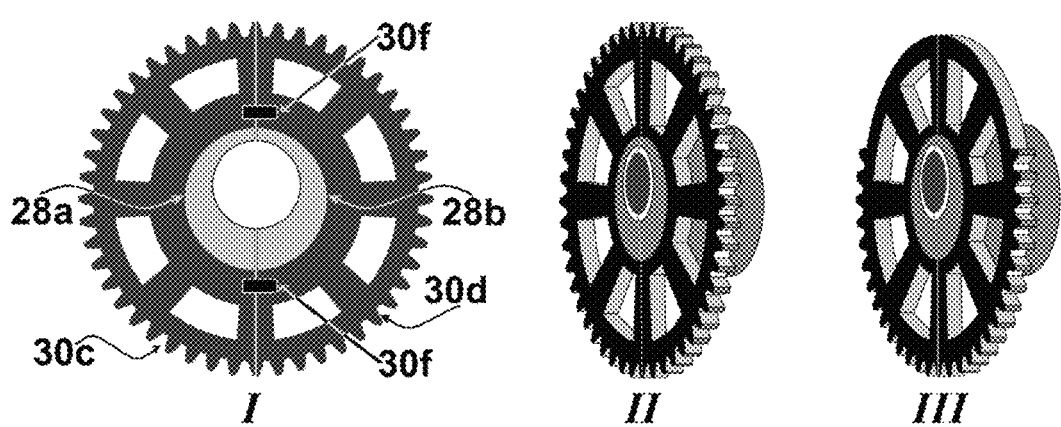
FIG. 9 shows different presentations of the master semi-gears of the present invention.

FIG. 9 shows different presentations of the master semi-gears (30 c and 30 d), where (I) sectioned gears are used in (I) using a complete hollow gear. Smooth gears (as in FIG. 8) can also be constructed in full format, In FIG. 9-I, there are fastening pins (30 f) to keep the semi-gears (30 c and 30 d) together, firmly hugging by means of the eccentrics (28 a and 28 b), trunnions of the crankshaft (12). In FIG. 9-II we see the same gear formed by the semi-gears (30 c and 30 d), in a lateral perspective, where one can clearly see the eccentric (28) protruding out of the set of semi-gears (30 c and 30 d). The visible cylindrical part of the eccentric (28), on the right, is exactly where the bronze bushings (13) will be supported firmly by the housing and the respective housing shim (16), to be presented in detail in later figures, FIG. 9-III shows that some teeth have been eliminated at the top of the master semi-gear set (30 c and 30 d), because there will be little more than half of the teeth, making it unnecessary for all to be available. Despite employing more material, the complete semi-gears (30 c and 30 d) (FIGS. 9-I and 9-II) are more versatile, as they have the advantage of being used with intermediate gear shafts (33) (31) in any positions, provided that they are properly controlled by the electronic control unit (37).

Figure 10:
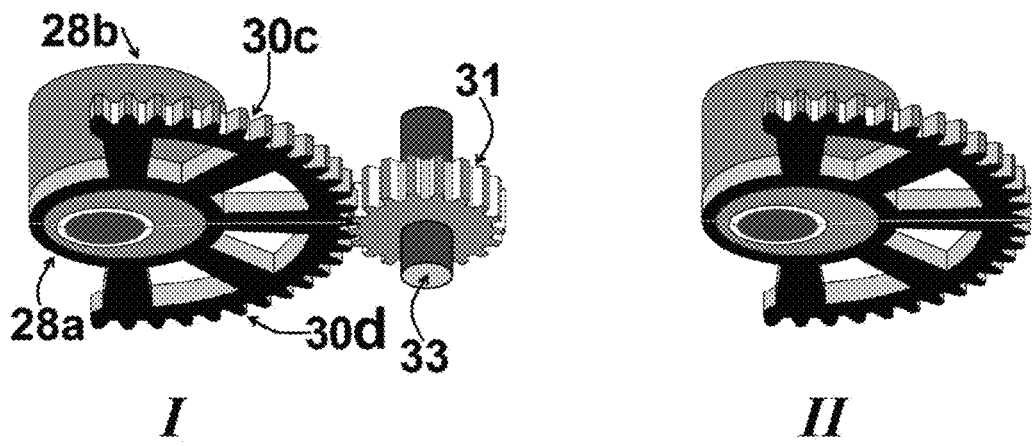
FIG. 10 shows the axis position of the intermediate gears placed (I) laterally on the engine and in relation to the master semi-gears; and (II) the semi-gears separately from the intermediate gear.

FIG. 10-I shows that the position of the shaft (33) of the intermediate gears (31) is placed laterally on the engine and in relation to the master semi-gears. This assembly, in practice, does not alter the result of the invention, showing that several positions are possible for this axis (33), provided that it is taken care that the master semi-gears (30 c and 30 d) correctly position the eccentrics (28), as it can be observed in this figure. Here the eccentric (28) is imposing an intermediate (or average) compression ratio; if the semi-gears (30 a and 30 d) are rotated clockwise (i.e. to the right) to the end of the teeth (those initially appearing in the figure at the top), the crankshaft (12) will assume the highest position, generating the high compression ratio; on the other hand, when turning in the opposite direction to the clock hands (i.e. to the left) to the end of the teeth (the ones that initially appear in the figure at the bottom), the crankshaft (12) will assume the lowest position, now generating the low compression ratio. FIG. 10-II only shows the master semi-gears (30 c and 30 d) separate from the intermediate gear (31).

Figure 11:
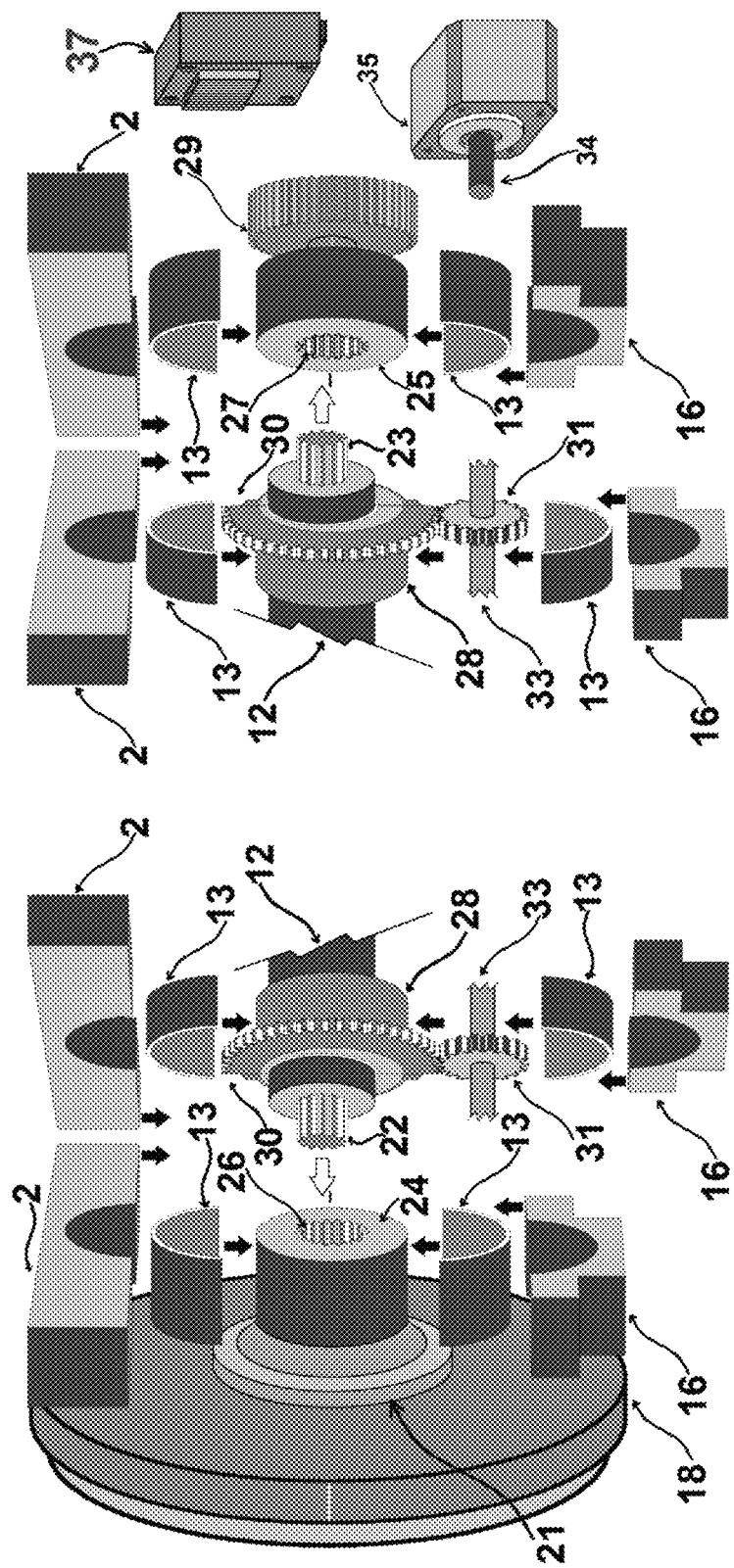
FIG. 11 shows an exploded view of the mechanisms and their main parts.
Figure 12:
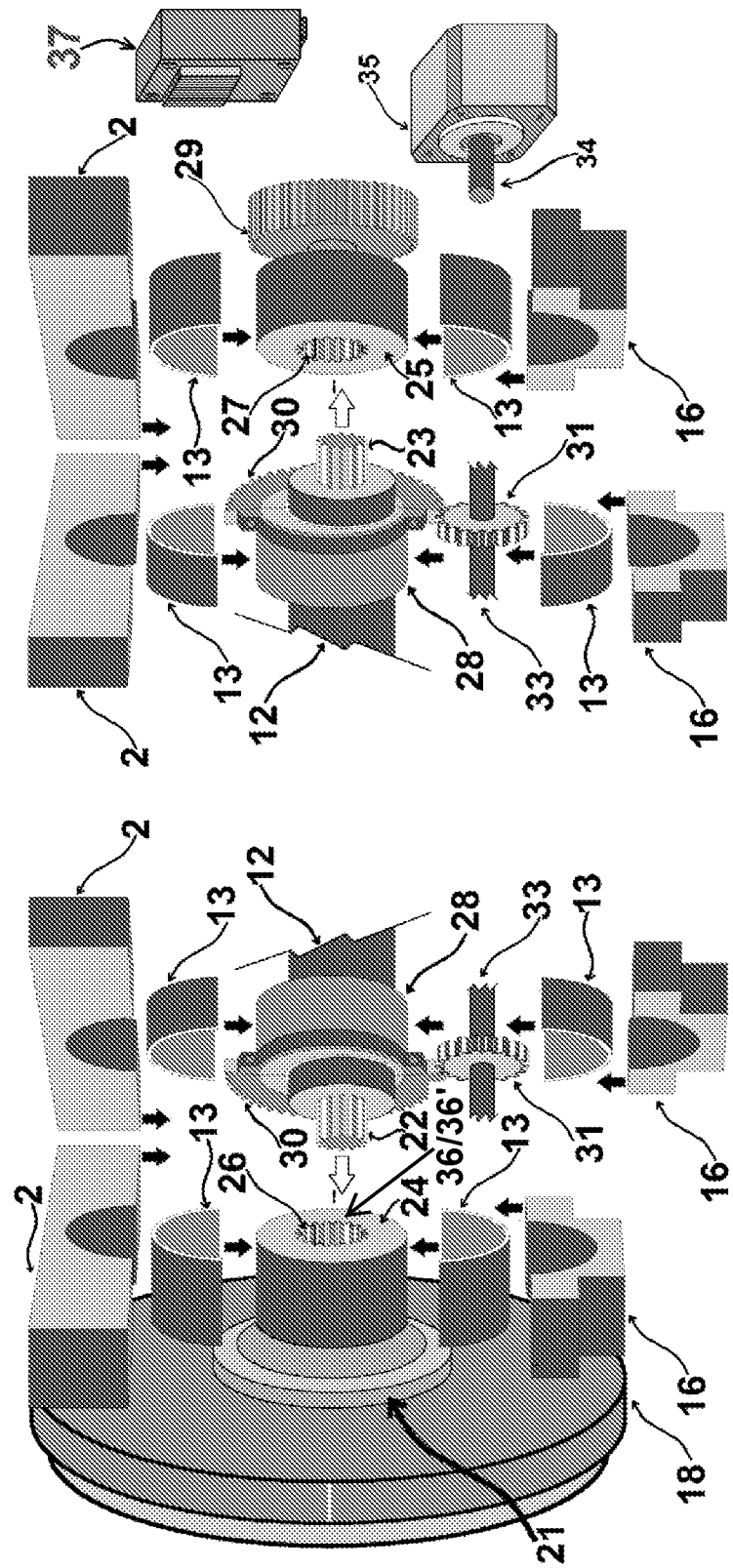
FIG. 12 shows an exploded view of the mechanisms and their main parts.

FIG. 11 shows several exploded views of the mechanisms and their main pieces in four provisions in FIGS. 11, 12, 13 and 14. The numbers in all drawings are the same, which will make it easier to identify the parts and their comparisons. FIGS. 11 and 12 are of the same arrangement of the variable compression ratio device according to the present invention, called direct [i.e., the crowns (26/27) are not in the crankshaft (12)], and can be identified, in both figures, as new parts in representation, the bearings (2), the bronze bushings (13), the shoe shims (16) of the bearings, remembering that the rotation couplers are composed of crowns (26/27) and sprockets (22/23), and in this direct arrangement, the crowns (26/27) are joined, respectively, to the flange (21) of the flywheel (18) and to the flange (25) of the toothed gear (29). Observing the position of the sprockets (22/23) in the eccentrics (28) and the master gears (30), at the front, it is observed, in this FIG. 11, which corresponds to the position in high compression ratio, observing that the sprockets (22/23) are positioned at the top of the crowns (26/27).

In FIG. 12, in relation to FIG. 11 (the previous one), the numbers are the same, as well as the arrangement of the rotation couplers (36/36'), which is the direct arrangement. However, in FIG. 12, it can be seen that the master gears (30) rotated 180° clockwise, standing behind, causing the eccentrics (28) to take the lower position, corresponding to the low compression ratio, noting that, now, the sprockets (22/23) are positioned at the bottom of the crowns (26/27).

Figure 13:
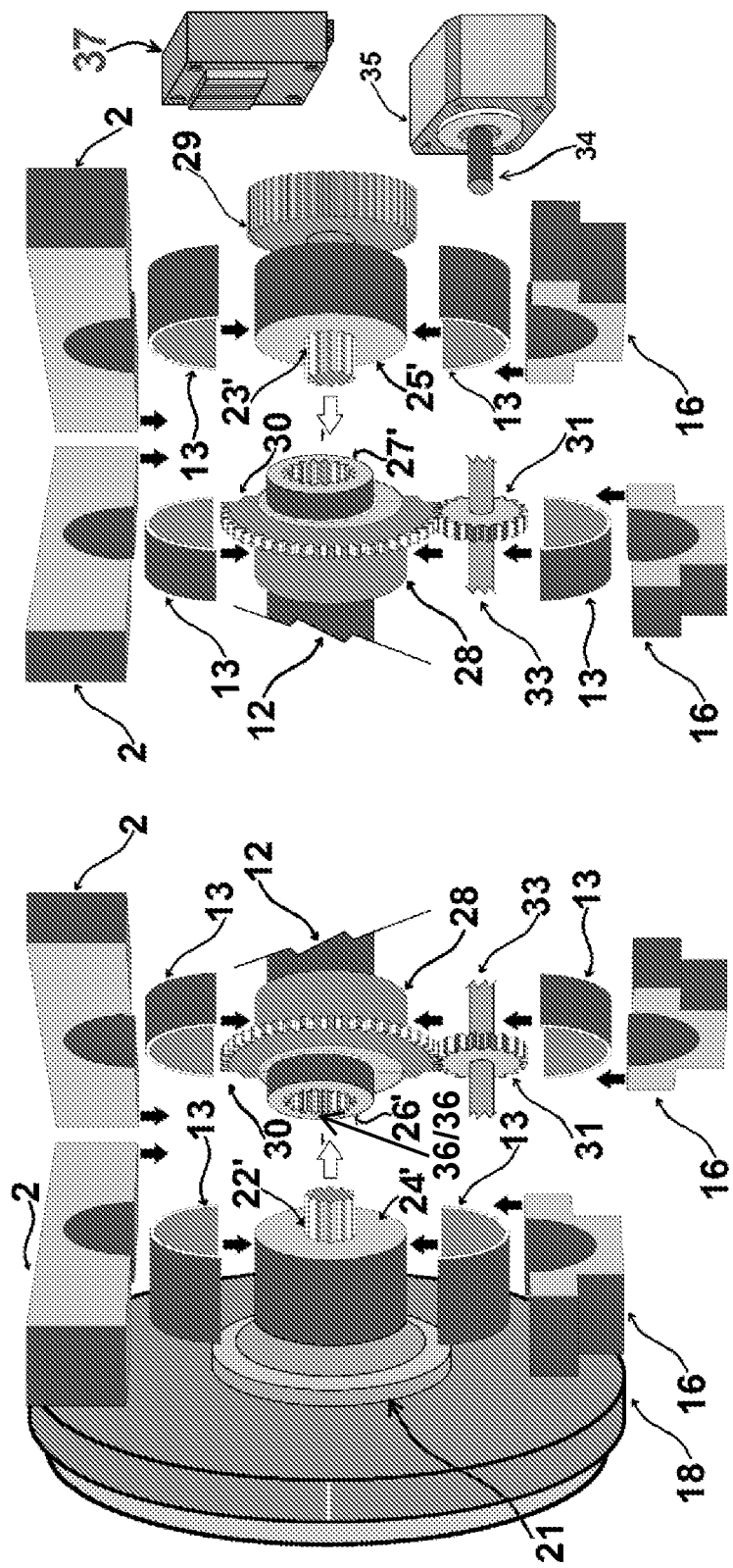
FIG. 13 shows an exploded view of the mechanisms and their main parts.

In FIG. 13, in relation to FIGS. 11 and 12, the numbers remain the same, except for rotation couplers (36/36), which now have crowns (26'/27') at the ends of the crankshaft (12), which is the indirect arrangement. Thus, the sprockets (22'/23') assume the connections with the flange (21) of the crankshaft (12) and the flange (25) of the toothed gear (29), and the master gears (30) are positioned at the front, and the position of the eccentrics (28) is the upper, which corresponds to the high compression ratio. Unlike FIG. 11, sprockets (22'/23') are now at the bottom of the crowns (26'/27').

Figure 14:
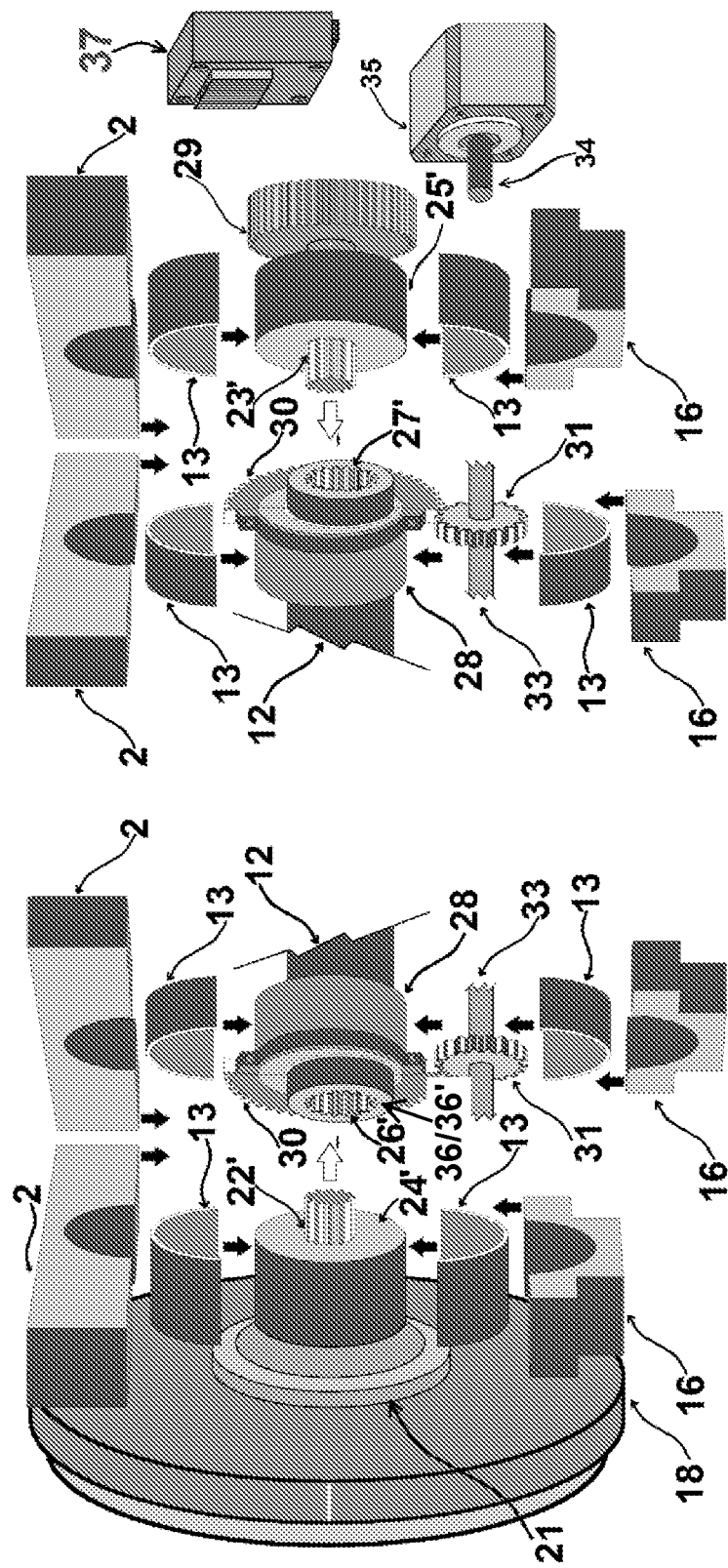
FIG. 14 shows an exploded view of the mechanisms and their main parts.

In FIG. 14, the numbers are the same as in FIG. 13, as are the rotation couplers (36/36'), which have the crowns (26/27') positioned at the ends of the crankshaft (12). This is also an indirect provision. In this figure, the master gears (30) go backwards, taking the eccentrics and, consequently, the crankshaft (12) to the bottom, corresponding to the low compression ratio. In this arrangement, the sprockets (22'/23') assume the top of the crowns (26'/27'). It is noteworthy that, both in the direct arrangement (FIGS. 11 and 12) and in the indirect arrangement (FIGS. 13 and 14), there is the possibility of assuming any compression ratios between the low (lowest) and the high (higher), just that the step motor or servomotor (35) imposes the appropriate movement, when actuated, thereto, by the electronic command center (37).

Figure 15:
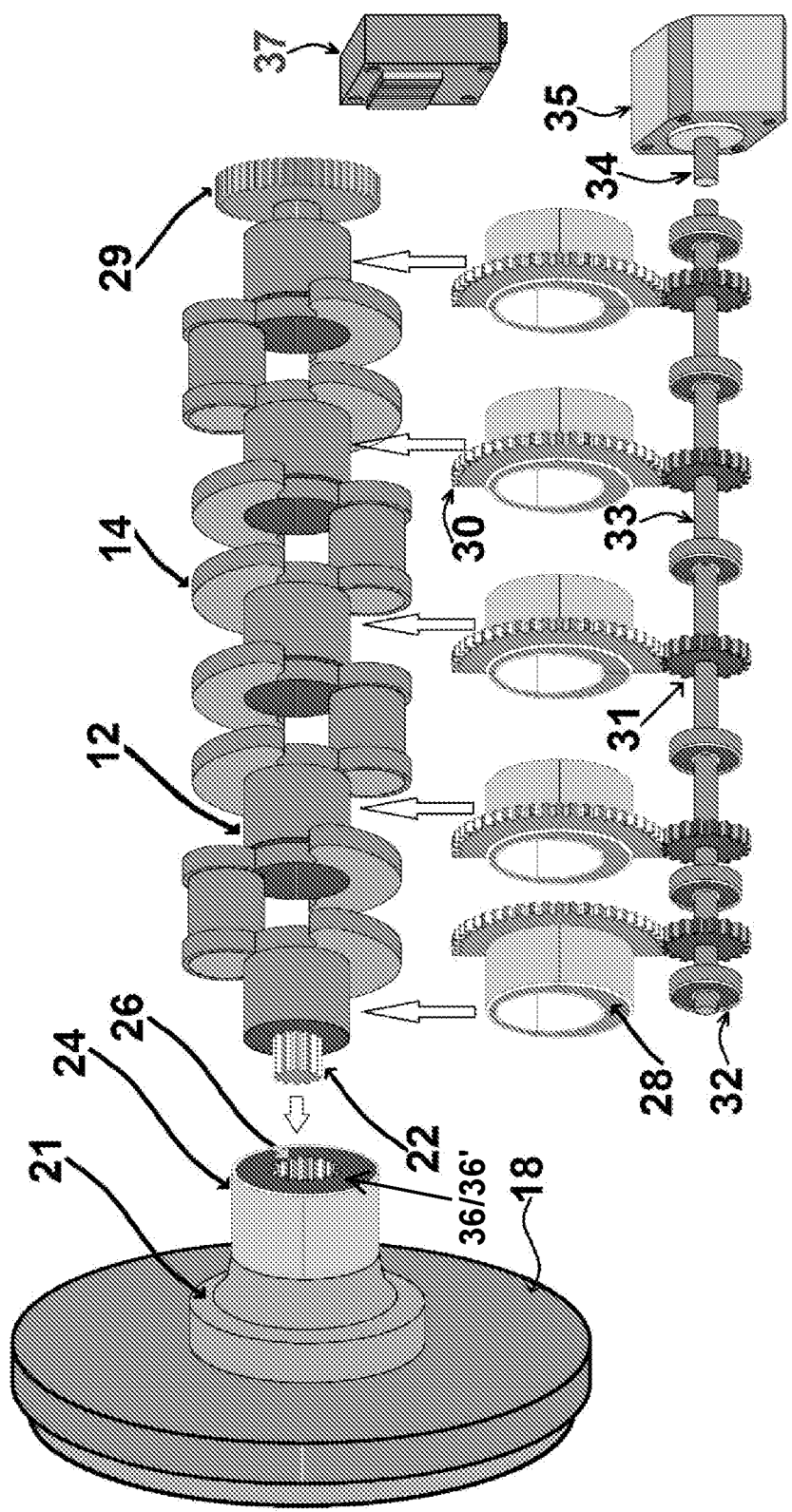
FIG. 15 presents a possible variation of application of the device according to the present invention.

FIG. 15 presents a possible variation of application of the variable compression ratio device according to the present invention where there will be only one rotation coupler (36) formed by the crown (26) and sprocket (22), installed on the side of the flywheel (18). For better visualization, the cam actuating mechanism is shown below, separated from the crankshaft (12), and the eccentrics (28) with the master gears (30), next to the intermediate gears (31) and their shaft (33). In the crankshaft (12), there are all the trunnions (where the eccentrics (28) will be installed). It is observed that this is a direct arrangement, because the crown (26) is attached to the flange (21) of the steering wheel. On the side of the toothed gear (29) there is no rotation coupler (36'), being directly attached to the crankshaft (12). With this, it will be necessary to provide a special device, composed of conveyor belt stretchers, which allows the toothed gear to monitor the translation movements of the eccentrics (28) and, at the same time, to receive, from the toothed gear (29), the rotational movements of the crankshaft (12). Such a provision will not be addressed in herein. Finally, it is observed, in this figure, that this direct arrangement is producing the high compression ratio, because the eccentrics (28) and the crankshaft (12) are in their upper position, It turns out that the single sprocket (22) will position itself inside the crown (26) at its top.

Figure 16:
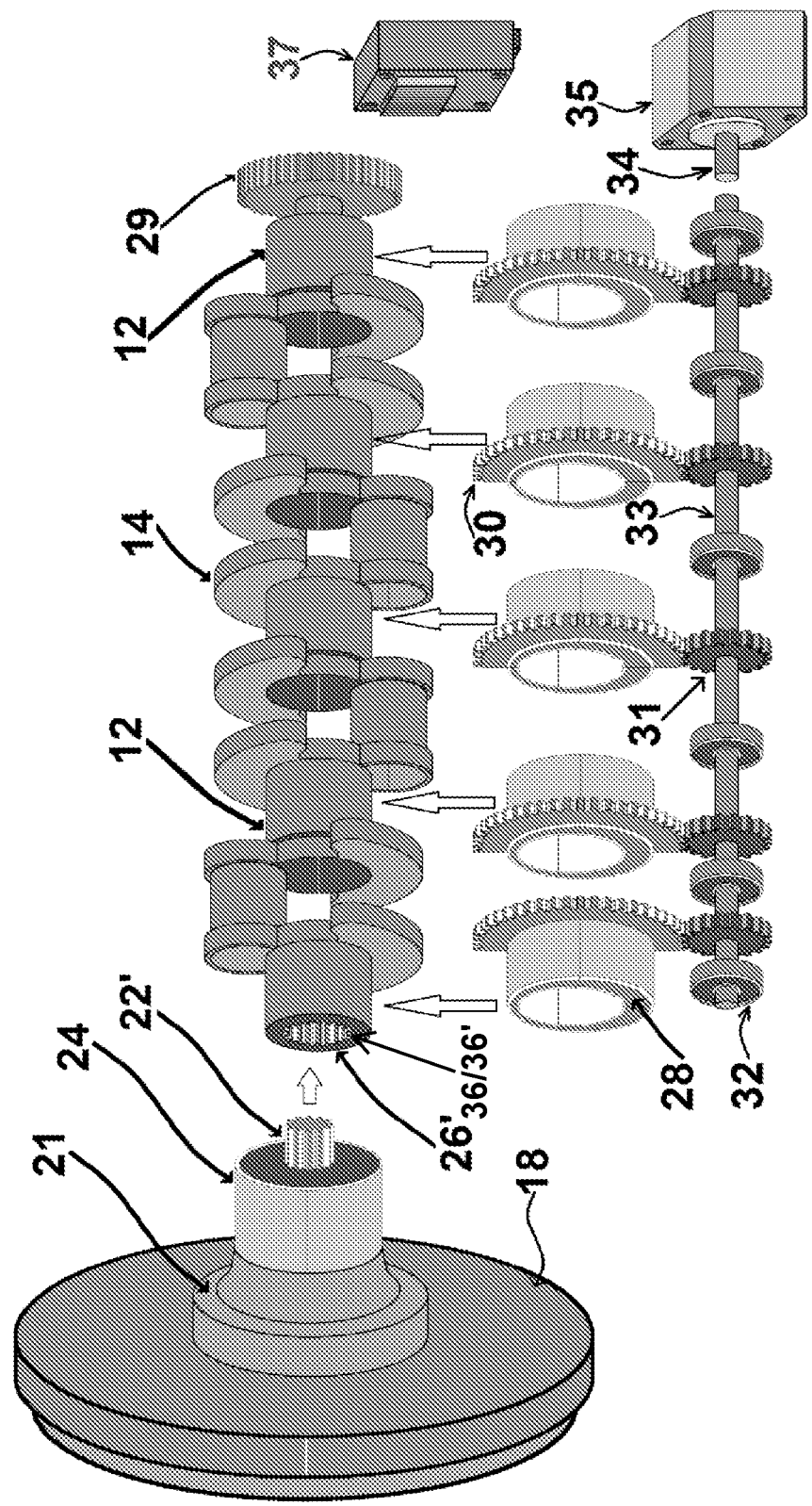
FIG. 16 presents another possible variation of application of the device of the present invention.

FIG. 16 presents another possible variation of application of the variable compression ratio device according to the present invention where there is also only one rotation coupler (36') formed by the crown (26') and the sprocket (22'), in the indirect arrangement, because the crown (26') is attached to the crankshaft (12) and the sprocket (22") is attached to the flange (21) of the flywheel (18). Identically to FIG. 15, the mechanism composed of eccentrics (28), semi-gears (30), shaft (33), in addition to the step motor or servomotor (35), is presented separately from the crankshaft (12) for better visualization. The device mentioned in FIG. 15 will also be necessary here, which allows the toothed gear (29) to follow the translational movements of the eccentrics (28), without prejudice to the transmission of rotational movements. In this Figure, the assembly produces the high compression ratio, because the crankshaft (12) is in its upper position. It turns out that the single sprocket (22') will position itself inside the crown (26') on its top.

Figure 17:
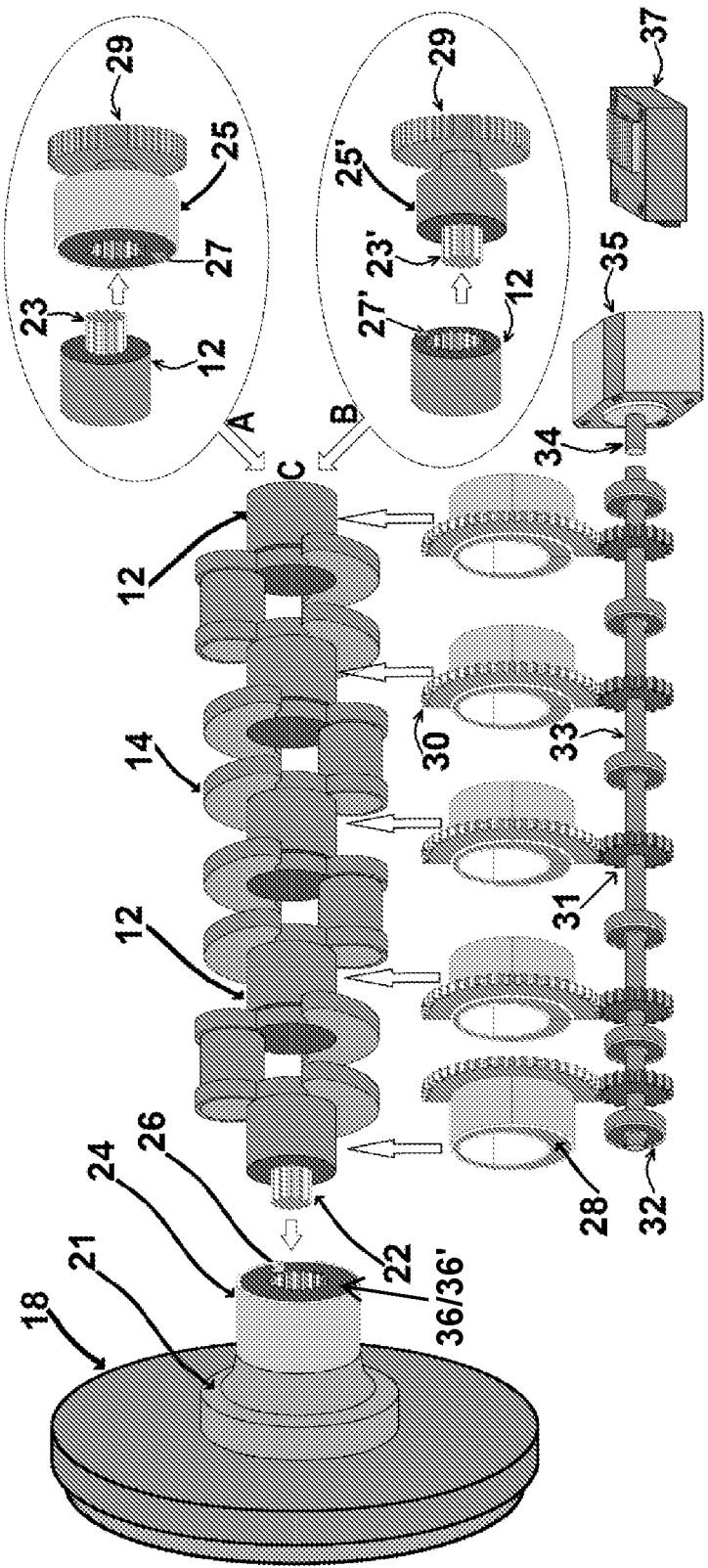
FIG. 17 presents two variations for direct arrangement on the side of the flywheel.

In FIG. 17, aiming to address as many options as possible of the application device for the variation of the compression ratio according to the present invention, this Figure presents two variations for the direct arrangement on the side of the flywheel, where the crown (26) is mounted on the flange (21) of the flywheel (18) and the sprocket (22) is at the end of the crankshaft. But at the opposite end of the crankshaft (12), where the flange (25) of the toothed gear (29) is located, it can be optionally mounted in two versions, which are:

I—Direct-direct or simply direct arrangement. In association with lens A in FIG. 17, it is seen that the crown (26/27) is mounted, respectively, on the flange (21) of the flywheel (18) and on the flange (25) of the toothed gear (29); the sprocket (22/23) is mounted on both sides of the crankshaft (12).

II—Direct-indirect arrangement: Analyzing with lens B of FIG. 17, we see that, as in the previous item (I), the rotation coupler (36) on the side of the flywheel (18) is in the direct version, with the crown (26) attached to the flange (21) of the flywheel (18) and the sprocket (22) on a side of the crankshaft (12), but on the opposite side of the crankshaft (12), the crown (27') is now on the side of the crankshaft (12) and the sprocket (23') is in the flange (25') of the toothed gear (29). Although the pure direct arrangement is the most recommended, it is necessary to show other options, to cover any variations of this invention.

Figure 18:
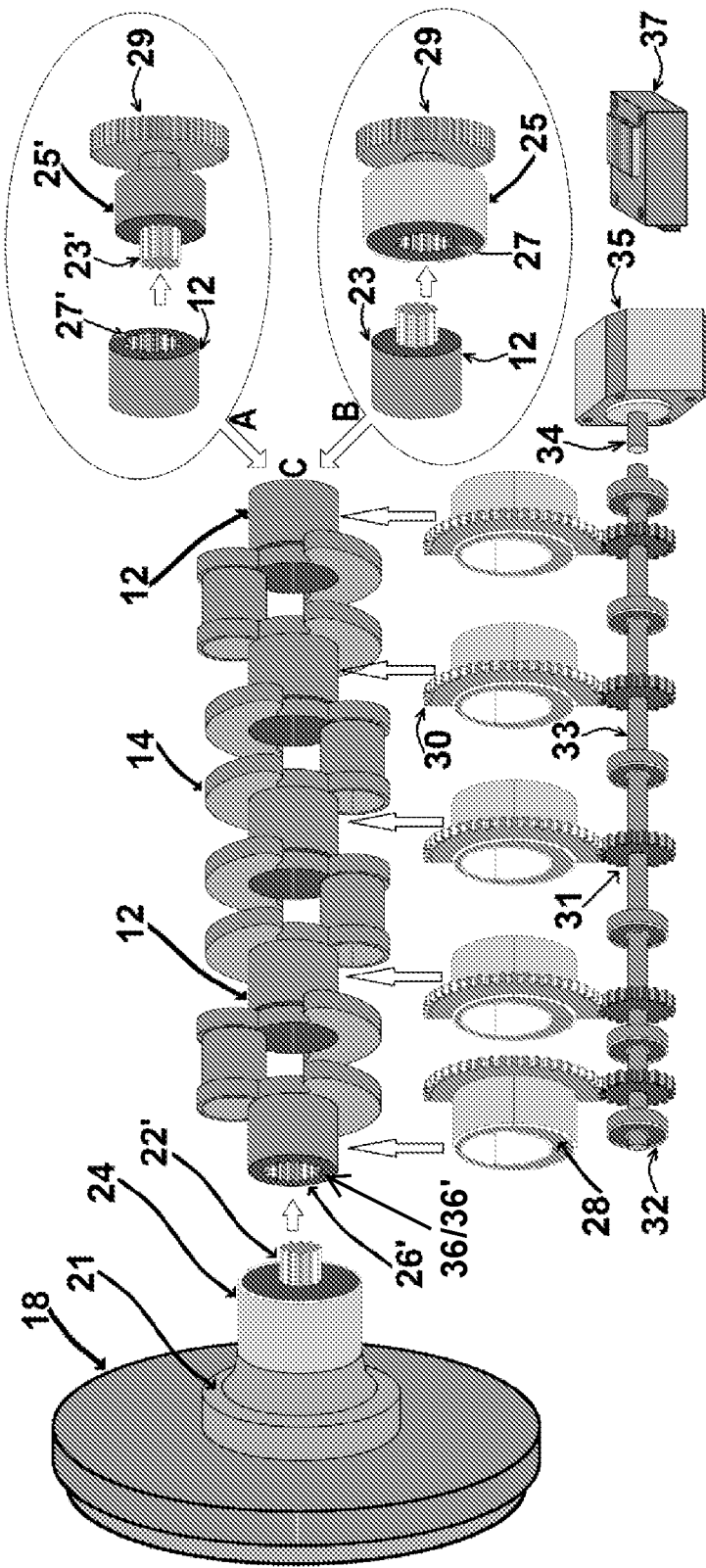
FIG. 18 presents two variations for indirect arrangement on the side of the flywheel.

In FIG. 18, continuing the approach of variations of application options of the variable compression ratio device according to the present invention, this Figure also presents two variations, and now, on the side of the flywheel (18), is the indirect arrangement, where the sprocket (22') is mounted on the flange (21) of the flywheel (18) and the crown (26') is mounted on the end of the crankshaft (12). The opposite end of the crankshaft (12), where the flange (25/25') of the toothed gear is located (29), can also be mounted, optionally, in two versions, which are:

I—Indirect-indirect or simply indirect arrangement: In FIG. 18, in lens A, we see that the crown (26'/27') is, respectively, mounted at the ends of the crankshaft (12) and the sprockets (22'/23') are located, respectively, in the flange (21) of the flywheel (18) and flange (25') of the toothed gear (29).

II—Indirect-direct arrangement: In lens B of FIG. 18, it is seen that, as in the previous item (I), the rotation coupler (36'), on the side of the flywheel (18), is in the indirect version, with the crown (26') mounted at the end of the crankshaft (12) and the sprocket (22'), connected to the flange (21) of the flywheel (18). But on the side of the toothed gear (29), lens b, is the direct version, where the sprocket (23) is mounted directly on the end of the crankshaft (12) and the crown (27) is mounted on the flange (25) of the toothed gear (29).

Figure 19:
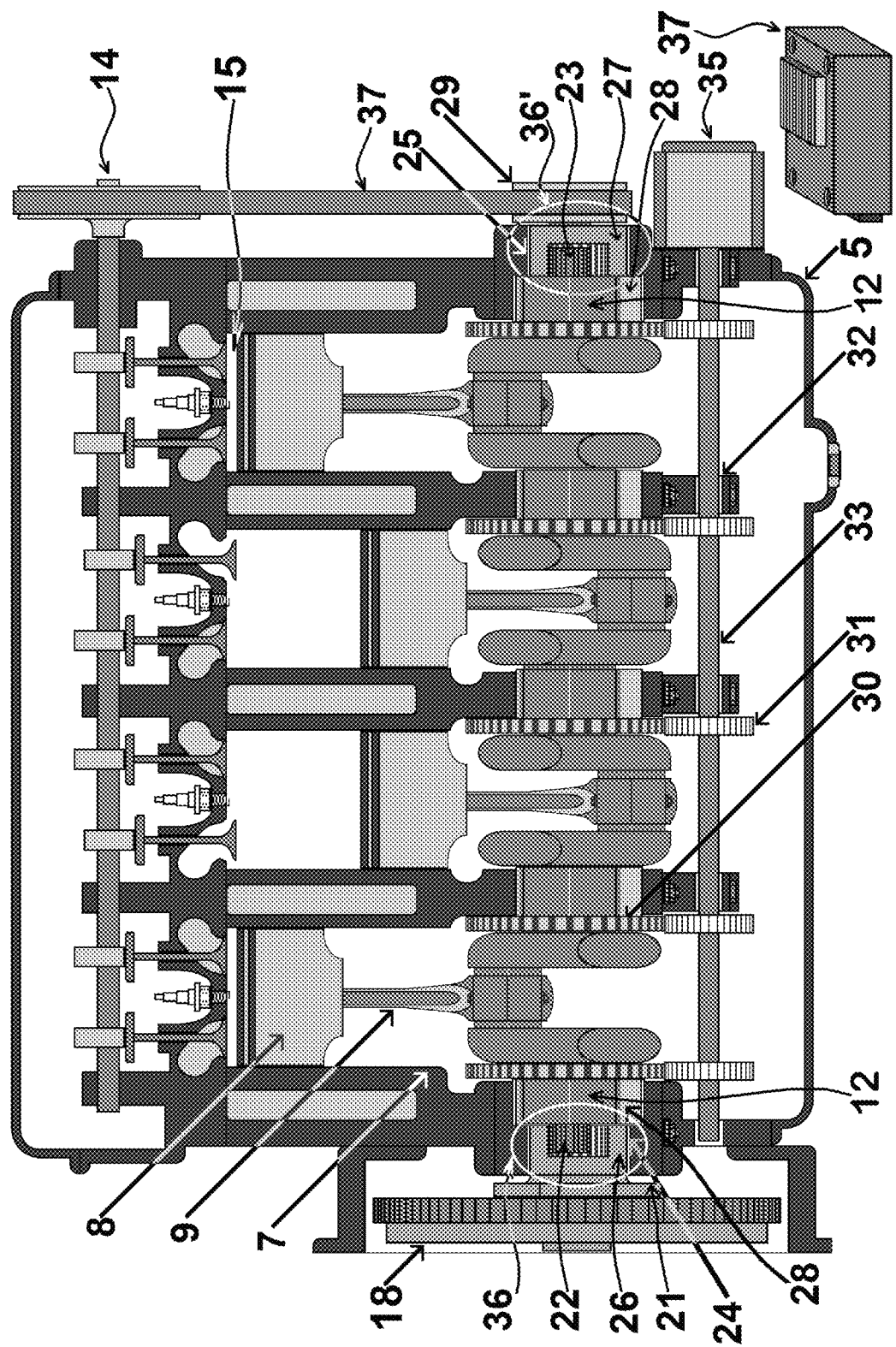
FIG. 19 shows a more complete internal combustion engine, with the inclusion of the variable compression ratio device in the direct arrangement.

FIG. 19 shows a more complete internal combustion engine, with the inclusion of the variable compression ratio device according to the present invention, in the direct arrangement, with the crowns (26/27), respectively, on a side of the flange (21) of the flywheel (18) and flange (25) of the toothed gear (29), where the rotation couplers (36/36') are identified, within the white ellipse, mounted respectively on a side of the flange (21) of the flywheel (18) and on a side of the flange (25) of the toothed gear (29). Although it has been mentioned, several times, the "flange" (25) of the toothed gear (29), in practice, may not exist, as it can become (or will become) more common the manufacture of an axis for the toothed gear (29) directly as an extension of the crown (27) of the rotation coupler (36') that is on the side of the toothed gear (29). Returning to FIG. 19, one can identify other common elements of an internal combustion engine, namely the cylinders (7), the pistons (8), the connecting rods (9), the crankshaft (12), by means of its cylinders, the belt of the control shaft (14), the combustion chamber (15) compressed, that is, with some (in this case, two) pistons (8) in the top dead. Similarly, there are, in this case, two pistons (8) in the bottom dead. This Figure also identifies the main elements of the variable compression ratio device according to the present invention, that is, the two rotation couplers (36/36), with the sprockets (22/23) attached to the crankshaft (12), respectively, on a side of the flange (21) of the flywheel (18) and a flange of the toothed gear (29); also as part of the rotation couplers (36/36), the crowns (26/27), joined respectively to the flange (21) of the flywheel (18) and to the flange of the toothed gear (29); other important elements can be located, such as eccentrics (28), master gears (30), intermediate gears (31) with their shaft (33), in addition to the step motor or servomotor (35) responsible for imposing translational movements to the crankshaft (12), by means of the various eccentrics (28). The position of the shaft (33) and its intermediate gears (31) and, consequently, the stepper or engine of the servomotor (35), is at the bottom of the engine, more specifically, in the crankcase (5) for better visualization of the variable compression ratio device according to the present invention, however, the assembly can be designed to occupy any position, it is also worth noting that the connection of the step motor or servomotor (35) with the shaft (33) can be direct, by means of a coupler or connector, or even by means of gears or endless shaft in any positions, which allow the best choice of the position of the parts of the variable compression ratio device according to the present invention.

Figure 20:
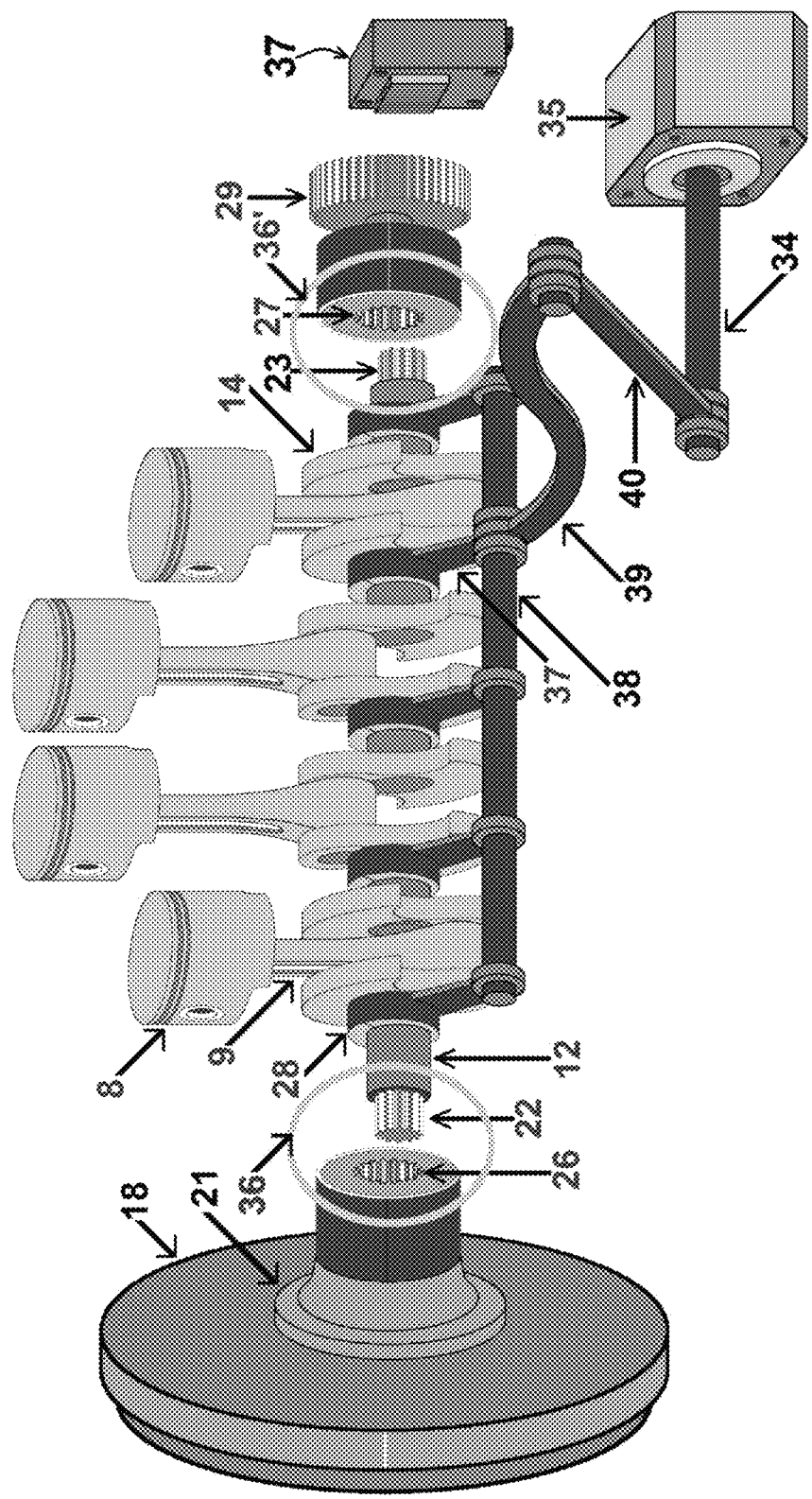
FIG. 20 shows an alternative embodiment of the variable compression ratio device according to the present invention.

FIG. 20 presents a very different option from the previous manufacturing device of variable compression ratio according to the present invention, within the same inventive concept, namely, to use two mechanisms, the eccentric actuator and the rotation coupler, the first provides the change in the height of the crankshaft (12) by the movement of eccentrics (28), and the second mechanism, the rotation couplers (36/36') will, by means of the crowns (26/27) and the sprockets (22/23), transfer the rotation of the crankshaft (12) to the flywheel (18), by means of the flange (21) and to the toothed gear (29), by means of the flange (25). In this variation (FIG. 20), the movement of eccentrics (28) will also be promoted by the stepper or servomotor engine (35), however, acting on a set of two or more axles (34 and 38 in FIG. 20), and in the movement of eccentrics, the master gears (30 in FIG. 19) and the intermediate gears (31 in FIG. 19) were replaced by levers (41) of the eccentrics (28), moved by the bar (39) and by the lever (40), connected, by the axle (34) to the stepper motor.

It should be said that the coupler assemblies (36/36') could eventually be replaced by planetary gears, chains or "joints" of the types Cardan, Schmidt, Oldham or homokinetics, which would allow the movement of the crankshaft (12). However, in such circumstances, there will be an excessive increase in the distance between the crankshaft (12) and the engine flywheel (18) and the toothed gear (29), in addition to increasing the number of parts required for coupling, which can become too fragile for the transmission of the effective torque of the engine. Planetary or concentric gears would also be possible to be adopted in this invention, instead of rotation couplers (36/36), however, despite keeping a small distance from the crankshaft (12) to the flywheel (18) and toothed gear (29), would require substantial increase of the lateral or radial space (diameter) and, consequently, of all eccentrics (28) of the crankshaft (12). Thus, it is confirmed to be the most appropriate and simple proposed coupling solution in the implementation of the present invention.

It is worth mentioning the importance of an adequate design for each engine, including in the programming of the electronic control unit (37), which compensates, due to its translation, any differences in angle in the turn of the crankshaft (12) in relation to the rotation of the control shaft (4) of the valves, which guarantees the timing and, consequently, the performance of the engine assembly.

As, in the translation of the crankshaft (12), going from the low compression ratio to the high compression ratio, as shown in FIG. 5 (I, II and III), there is a variable lateral displacement of the crankshaft (12), observable in the cited figure, of the sprockets (22/23) in relation to the axis of the piston (8), (offset by "offset", purposely used in some engines, such as the Firefly, of Fiat, whose offset is 10 mm), in engines that use the variable compression ratio device according to the present invention, the offset will be variable from 0.0 mm up to half the variation in displacement of the piston (8) between the low compression ratio and the high compression ratio. If this offset is, for example, 8.0 mm, the offset is 4.0 mm. If the engine, as in the cited firefly, has its own offset, for example, of 10.0 mm, it will be necessary to consider the additional and variable offset caused by eccentrics (28).

To enable the execution of the present invention, making it attractive to the industry, whether engine vehicles, motorcycles or stationary engines and all other engines derived from these applications, the objective here, within the same inventive concept, to present several effective, economical solutions, easy to implement and maintain. For this, this invention may be included in the new projects of internal combustion engines, which allows the variation of the compression ratio of these engines. For its simplicity, as presented herein, several current engines may benefit from this invention, with some changes therein. It is also possible to include the variable compression ratio device according to the present invention in some of the engines already available; in this case, such inclusion can be made by means of adaptive modules (kits) that the market may eventually offer, if it considers to be mechanically and economically viable and advantageous.

Summing up what has been shown so far, the present invention basically consists of varying, by means of an elaborate mechanism, (the actuation of the eccentrics) the distance between the crankshaft (12) (also known as crankshaft or crank trees) and the top of the cylinders (7), keeping constant the overall size of the pistons (8) and connecting rods (9). Such variation of a position of the crankshaft (12) will be obtained by means of an additional housing, with a body of the eccentric (28) which, varied by the turning imposed by a step motor or servomotor (35), associated with an axis (33) of intermediate gears (31), will actuate the master clears (30) connected to the eccentrics (28), which will cause the crankshaft (12) to be repositioned upwards, down or to any intermediate positions, being accompanied by pistons (8), allowing to change the minimum or compressed volume of the cylinder (7). These changes in the minimum volume of the cylinder (7) determine the imposed variations in the compression ratio, commanded by an electronic control center (37), which may be the same used for the general control of the engine, if it incorporates the control of this device. In the possible adaptation of the device detailed here in an engine in use, it may be necessary to provide an electronic control center (37) exclusive to the device and exchange information with the original electronic control center. However, there is no point in having a mechanism for varying the compression ratio, as explained above, if there is no other mechanism that makes the coupling of the turns of the crankshaft (12) to the flywheel (18), however, isolating the translational movements of this crankshaft (12). This mechanism, as detailed in FIG. 4 (and other) and their descriptions, are the rotation couplers (36/36'), composed of internal gears, the crowns (26/27, in the direct version, or 26'/27', in the indirect version) together with the sprockets (22/23, in the direct version, or 22'/23', in the indirect version). Thus, the combination of the above mechanisms (rotation couplers and eccentric actuator), forms the device of variable compression ratio according to the present invention.

Thus, referring to FIGS. 4 to 19, it is verified that the device for the variation of the compression ratio according to the present invention consists, in essence, of a set of mechanical, electrical and electronic parts and accessories that, combined, promote the elevation or lowering of the Crankshaft (12) which, in turn, will change the distance of the piston (8) to the top of the cylinder (7), by means of the connecting rod (9). As a result, there will be a change in the volume of the combustion chamber (15 FIG. 19), imposing modifications in the compression ratio of the engine to which the device is included, So as the crankshaft (12) to have its position altered, it will be supported by eccentrics (28), these being moved by the master gears (30), which can be of various types, as shown in FIGS. 8), (9) and (10). By turning the master gears (30), there are the intermediate gears (31), fixed to an axis (33) responsible for rotating as many gears as the eccentrics (28). At one end of this shaft (33), the axle (34) of the stepper or servomotor (35) will be connected, the shaft of which (34) may optionally have a connecting mechanism to the shaft (33), consisting of one or more gears, endless shaft, levers, or other coupling options that allow the two shafts to be properly connected (33 and 34). The purpose of the stepper or servomotor engine (35) is to generate the rotational movements at exact angles, determined by an electronic control unit (37), which will determine, by means of the gears and associated axles, the exact point of positioning of the crankshaft (12) to produce, in the combustion chamber (15), the most suitable compression ratio for fuel or the mixture of fuels used in the internal combustion engine, depending on the analysis of the various sensors of the engine and their parameters, aiming to obtain their best performance. With this, the internal combustion engine will be running within the best possible characteristics with the correct compression ratio.

Without exhausting the possible applications and utilities of the present invention, there is, for example, the option of, before starting the engine, put the compression ratio in the lowest position allowed by the set, resulting in less opposition to the movement imposed by the starter engine, because the internal combustion engine will be looser, freer. Immediately after the engine "picks up" (goes into operation), the combustion rate will be reset to the ideal value at the desired gear. This option will allow more economical, light weight or durable starters, in addition to reducing initial shake while the internal combustion engine has not "picked up", that is, it has not started to work alone.

Another common situation is the need to change the compression ratio when the vehicle engine is at varying speeds, accelerating or decelerate, in the city or on the road, with single fuel, for example, ordinary gasoline, additive, ethanol (ethanol) common or additive, natural gas, diesel, biodiesel, etc., or with the permitted mixtures of these fuels. With this, the present invention, by providing a rational solution to manage and change the compression ratio of internal combustion engines, will favor the improvement of the performance of these engines in any situation, with the consequent reduction of fuel consumption and environmental pollution, reduction of the size and weight of engines due to higher power in smaller volumes, allowing to manufacture engines, with equivalent power, lighter and cheaper, with the inclusion of this device and, even so, more economical and less polluting.

An important feature of the variable compression ratio device according to the present invention in relation to almost all other known technological proposals that attempt to allow the variation of the compression ratio, is to have no moving parts associated with the normal moving power components of the internal combustion engine, such as crankshaft (12), connecting rods (9) and pistons (8), except for the movements of couplers, thus reducing wear and static and dynamic weights on the engine.

With regard to the application of the variable compression ratio device according to the present invention in engines already in use or in available designs, it may be offered, in any of the versions presented in this report, in the form of adaptive kits, by the companies supplying auto parts, in specific models for each type of engine, previously evaluating the mechanical, economic and market viability. Of course, in this case, a specific electronic control center should be provided for the kit, working from the original electronic control center of the vehicle or a complete replacement of the original design.

As demonstrated, this invention associates a mechanism, which is the actuator of eccentrics (which alters the compression ratio by varying the position of the crankshaft in relation to the top of the cylinders, by means of eccentrics) with another mechanism here called the rotation coupler (responsible for coupling the ends of the crankshaft to external elements), forming, with the association of these two mechanisms, the variable compression ratio device, which will allow the variation of the compression ratio to be obtained without having to increase, in relation to conventional engines, the number of moving parts that perform alternating movements in association with pistons, connecting rods and crankshafts. In certain cases, the number of these parts may even be lower than in a conventional engine, because the engine with variation in compression ratio has higher performance, allowing the manufacture of engines with the same power, but with less displacement and even with a smaller number of cylinders.

What is claimed is:

1. A variable compression ratio device configured to be incorporated into an internal combustion engine, the internal combustion engine comprising one or more cylinders housing pistons that are coupled to a crankshaft, the variable compression ratio device comprising:
rotation coupler assemblies, formed by gears that have internal and external teeth that are disposed at distal ends of the crankshaft to cause the crankshaft to rotate; and
two or more eccentrics configured to cause translation variations of the crankshaft, wherein:
the two or more eccentrics are positioned on trunnions of the crankshaft before and after each connecting rod and respective balances;
the translation variations are to be converted into rotation and transmitted to a toothed gear and to a flange of a flywheel; and
the two or more eccentrics are aligned with corresponding gears to cause changes in translation of a position of the crankshaft in any angle from 0° to 180° responsive to actuation by an electronic control unit that causes a step motor or servomotor to transfer movements of the step motor or the servomotor to a shaft that has a same quantity of intermediate gears as a quantity of the corresponding gears joined to the two or more eccentrics.

2. The variable compression ratio device of claim 1, wherein the rotation coupler assemblies comprise:
a first rotation coupler assembly comprising a crown coupled to a flywheel and a first sprocket coupled to a first distal end of a crankshaft; and
a second rotation coupler assembly comprising a crown assembly coupled to the toothed gear and a second sprocket coupled to a second distal end of the crankshaft, wherein the rotation coupler assemblies are configured to transfer rotation of the crankshaft while isolating translational motion of the crankshaft.

3. The variable compression ratio device of claim 1, wherein:
the rotation coupler assemblies comprise a first rotation coupler comprising a crown coupled to the flywheel and a first sprocket coupled to a first distal end of the crankshaft; and
wherein the variable compression ratio device further comprises an eccentric actuator.

4. The variable compression ratio device of claim 1, wherein the variable compression ratio device is an accessory or kit to be installed in the internal combustion engine.

5. The variable compression ratio device of claim 1, wherein the gears are at least one of partial or complete, the gears being associated with the eccentrics, wherein the eccentrics are configured to turn to alter the position of the crankshaft in relation to a top of the cylinders.

6. The variable compression ratio device of claim 1, wherein a portion of the rotation coupler assemblies is attached directly to the flange of the flywheel.

7. The variable compression ratio device of claim 1, wherein a portion of the rotation coupler assemblies is attached directly to a flange of the toothed gear.

8. A variable compression ratio device configured to be incorporated into an internal combustion engine, the variable compression ratio device comprising:
rotation coupler assemblies, formed by gears that have internal and external teeth that are disposed at distal ends of a crankshaft of the internal combustion engine to cause the crankshaft to rotate;
an eccentric actuator configured to cause changes in a relative position of the crankshaft; and
an electronic control unit that is configured to actuate a step motor or servomotor to cause eccentrics of the eccentric actuator to change the relative position of the crankshaft in relation to a top of cylinders of the internal combustion engine to control a compression rate of combustion chambers of the internal combustion engine, wherein a turn of the crankshaft is transferred to a flywheel and a toothed gear via the rotation coupler assemblies belt.

9. The variable compression ratio device of claim 8, wherein the rotation coupler assemblies comprise:
a first rotation coupler assembly comprising a crown coupled to a flywheel and a first sprocket coupled to a first distal end of a crankshaft; and
a second rotation coupler assembly comprising a crown assembly coupled to the toothed gear and a second sprocket coupled to a second distal end of the crankshaft, wherein the rotation coupler assemblies are configured to transfer rotation of the crankshaft while isolating translational motion of the crankshaft.

10. The variable compression ratio device of claim 8, wherein:
the rotation coupler assemblies comprise a first rotation coupler comprising a crown coupled to the flywheel and a first sprocket coupled to a first distal end of the crankshaft; and
the variable compression ratio device further comprises an eccentric actuator.

11. The variable compression ratio device of claim 8, wherein the variable compression ratio device is an accessory or kit to be installed in the internal combustion engine.

12. The variable compression ratio device of claim 8, wherein the gears are at least one of partial or complete, the gears being associated with the eccentrics, wherein the eccentrics are configured to turn to alter the position of the crankshaft in relation to a top of the cylinders.

13. The variable compression ratio device of claim 8, wherein a portion of the rotation couple assemblies is attached directly to a flange of the flywheel.

14. The variable compression ratio device of claim 8, wherein a portion of the rotation coupler assemblies is attached directly to a flange of the toothed gear.

15. An internal combustion engine comprising:
one or more cylinders housing pistons that are coupled to a crankshaft; and
variable compression ratio device comprising:
rotation coupler assemblies formed by gears that have internal and external teeth that are disposed at distal ends of the crankshaft to cause the crankshaft to rotate; and
two or more eccentrics configured to cause translation variations of the crankshaft, wherein:
the two or more eccentrics are positioned on trunnions of the crankshaft before and after each connecting rod and respective balances;
the translation variations are to be converted into rotation and transmitted to a toothed gear and to a flange of a flywheel; and
the two or more eccentrics are aligned with corresponding gears to cause changes in translation of a position of the crankshaft in any angle from 0° to 180° responsive to actuation by an electronic control unit that causes a step motor or servomotor to transfer movements of the step motor or the servomotor to a shaft that has a same quantity of intermediate gears as a quantity of the corresponding gears joined to the two or more eccentrics.

16. The internal combustion engine of claim 15, wherein the rotation coupler assemblies comprise:
a first rotation coupler assembly comprising a crown coupled to a flywheel and a first sprocket coupled to a first distal end of a crankshaft; and
a second rotation coupler assembly comprising a crown assembly coupled to the toothed gear and a second sprocket coupled to a second distal end of the crankshaft, wherein the rotation coupler assemblies are configured to transfer rotation of the crankshaft while isolating translational motion of the crankshaft.

17. The internal combustion engine of claim 15, wherein:
the rotation coupler assemblies comprise a first rotation coupler comprising a crown coupled to the flywheel and a first sprocket coupled to a first distal end of the crankshaft; and
wherein the variable compression ratio device further comprises an eccentric actuator.

18. The internal combustion engine of claim 15, wherein the gears are at least one of partial or complete, the gears being associated with the eccentrics, wherein the eccentrics are configured to turn to alter, the position of the crankshaft in relation to a top of the cylinders.

19. The internal combustion engine of claim 15, wherein a portion of the rotation coupler assemblies s attached directly to the flange of the flywheel.

20. The internal combustion engine of claim 15, wherein a portion of the rotation coupler assemblies s attached directly to the flange of the toothed gear.

* * * * *